United States Patent
Ashida et al.

(10) Patent No.: US 11,222,532 B2
(45) Date of Patent: Jan. 11, 2022

(54) TRAFFIC CONTROL SUPPORT SYSTEM, TRAFFIC CONTROL SUPPORT METHOD, AND PROGRAM RECORDING MEDIUM

(71) Applicant: NEC Corporation, Tokyo (JP)

(72) Inventors: Yuta Ashida, Tokyo (JP); Itaru Nishioka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 223 days.

(21) Appl. No.: 16/315,215

(22) PCT Filed: Jul. 7, 2017

(86) PCT No.: PCT/JP2017/024885
§ 371 (c)(1),
(2) Date: Jan. 4, 2019

(87) PCT Pub. No.: WO2018/012414
PCT Pub. Date: Jan. 18, 2018

(65) Prior Publication Data
US 2019/0311615 A1    Oct. 10, 2019

(30) Foreign Application Priority Data
Jul. 13, 2016 (JP) .............................. JP2016-138628

(51) Int. Cl.
*G08G 1/01* (2006.01)
*G06N 5/04* (2006.01)
(Continued)

(52) U.S. Cl.
CPC .......... *G08G 1/0145* (2013.01); *G06N 5/046* (2013.01); *G08G 1/00* (2013.01); *G08G 1/0129* (2013.01); *G08G 1/052* (2013.01)

(58) Field of Classification Search
CPC .......... G08G 1/00; G08G 1/01; G08G 1/0104; G08G 1/0108; G08G 1/0112;
(Continued)

(56) References Cited

U.S. PATENT DOCUMENTS

| 8,781,736 B2 * | 7/2014 | Cera ........................ G08G 1/09 701/458 |
| 8,798,897 B2 * | 8/2014 | Fei ....................... G08G 1/0141 701/118 |

(Continued)

FOREIGN PATENT DOCUMENTS

| JP | 2001-133274 A | 5/2001 |
| JP | 2006-285689 A | 10/2006 |

(Continued)

OTHER PUBLICATIONS

International Search Report for PCT Application No. PCT/JP2017/024885, dated Oct. 3, 2017.
English translation of Written opinion for PCT Application No. PCT/JP2017/024885.

*Primary Examiner* — Geepy Pe
*Assistant Examiner* — Michael Allen Brace, Jr.

(57) ABSTRACT

A traffic control support system for accurately predicting, when an irregular event occurs, a traffic state and an influence of the event on the traffic state, is provided. The traffic control support system includes calculation means for calculating, based on a relation between a flow rate and a density of traffic and a predicted value of the density in a regular state in each of a plurality of locations, an estimated value of the density in each of one or more locations at a specific time after an event starting time representing a time at which an irregular event occurs in at least one of the plurality of locations, and display control means for display-
(Continued)

ing an influence of the irregular event on traffic in each of one or more locations, based on an estimated value of the density.

11 Claims, 17 Drawing Sheets

(51) Int. Cl.
  *G08G 1/052* (2006.01)
  *G08G 1/00* (2006.01)
(58) Field of Classification Search
  CPC .. G08G 1/0116; G08G 1/0125; G08G 1/0129; G08G 1/0133; G08G 1/0141; G08G 1/0145; G08G 1/052; G08G 1/16; G08G 1/164; G08G 1/166; G06N 5/00; G06N 5/046; G06N 20/00
  USPC .......................................................... 700/117
  See application file for complete search history.

(56) References Cited

U.S. PATENT DOCUMENTS

| | | | |
|---|---|---|---|
| 8,880,323 B2* | 11/2014 | Jain | G08G 1/127 701/119 |
| 2004/0119612 A1* | 6/2004 | Chen | G08G 1/09675 340/995.13 |
| 2005/0171649 A1* | 8/2005 | Adachi | G01C 21/3691 701/1 |
| 2007/0208492 A1* | 9/2007 | Downs | G08G 1/0104 701/117 |
| 2008/0175161 A1* | 7/2008 | Amemiya | G08G 1/0104 370/252 |
| 2014/0114556 A1 | 4/2014 | Pan et al. | |
| 2015/0206427 A1* | 7/2015 | Blandin | G08G 1/0141 701/117 |

FOREIGN PATENT DOCUMENTS

| | | | |
|---|---|---|---|
| JP | 2007-219633 A | | 8/2007 |
| JP | 2007219633 A | * | 8/2007 |

* cited by examiner

Fig. 4

| STARTING POINT | END POINT | START TIME | END SCHEDULED TIME | TYPE | COUNTERMEASURE |
|---|---|---|---|---|---|
| 50-KILOMETER POST | 55-KILOMETER POST | 2016/7/1 22:00 | 2016/7/2 2:00 | CONSTRUCTION WORK | ONE-LANE REGULATION |
| 8-KILOMETER POST | 10-KILOMETER POST | 2016/7/1 23:30 | 2016/7/2 2:30 | ACCIDENT | ONE-LANE REGULATION |

Fig. 14

| SCENARIO | PROCESS CONTENT |
|---|---|
| SCENARIO 1-1 | TRAFFIC LANE REGULATION (ONE-LANE REGULATION) |
| SCENARIO 1-2 | TRAFFIC LANE REGULATION (TWO-LANE REGULATION) |
| SCENARIO 1-3 | TRAFFIC LANE REGULATION (ALL-LANE REGULATION) |
| SCENARIO 2-1 | INWARD TRAFFIC REGULATION (NUMBER OF CLOSED GATES 1) |
| SCENARIO 2-2 | INWARD TRAFFIC REGULATION (NUMBER OF CLOSED GATES 2) |
| ⋮ | ⋮ |
| SCENARIO 3-1 | SPEED REGULATION (80km/h) |
| SCENARIO 3-2 | SPEED REGULATION (50km/h) |
| ⋮ | ⋮ |

TRAFFIC CONTROL SUPPORT SYSTEM, TRAFFIC CONTROL SUPPORT METHOD, AND PROGRAM RECORDING MEDIUM

This application is a National Stage Entry of PCT/JP2017/024885 filed on Jul. 7, 2017, which claims priority from Japanese Patent Application 2016-138628 filed on Jul. 13, 2016, the contents of all of which are incorporated herein by reference, in their entirety.

TECHNICAL FIELD

The present invention relates to a traffic control support system, a traffic control support method, and a program recording medium.

BACKGROUND ART

It has been possible to recognize, in a wide range and without any time delay, a road traffic state by using traffic data collected by sensors installed in a road, or sensors mounted on vehicles. In addition, a large number of techniques for predicting a future traffic state by analyzing the collected traffic data also have been proposed. When the traffic state can be predicted, a vehicle travel time can be estimated with high accuracy. Accordingly, it is expected that a satisfaction level of road users is improved.

Traffic congestion, which is one of traffic states, is roughly divided into two types, i.e., general traffic congestion caused by excess traffic demand, and abnormal traffic congestion caused by an irregular event such as an accident or construction work. The abnormal traffic congestion is caused by a deterioration in traffic capacity in association with traffic lane regulation (traffic lane blockade). Accordingly, a scale of the traffic congestion tends to increase with a lapse of time. Prediction of a time change in the abnormal traffic congestion with high accuracy leads to an improvement in a satisfaction level and safety of road users.

As a technique for predicting abnormal traffic congestion, for example, PTL1 discloses a traffic status prediction device that predicts a future traffic status by using a particular feature even in a case where an accident occurs. In this traffic status prediction device, traffic regulation information is used as a feature, and a regulation duration time in a regulation location is obtained by using a proportional hazard model, thereby predicting a traffic status in a regulation location where an accident occurs, and estimating a traveling time.

In addition, PTL2 discloses a method of learning a range in which an accident has an influence on a traffic flow, a time difference until the influence is transmitted, and a degree of speed deterioration when the influence is transmitted, as features based on past performances, and predicting deterioration in speed due to an accident.

CITATION LIST

Patent Literature

PTL1: Japanese Patent Application Laid-Open Publication No. 2006-285689
PTL2: Specification of United States Patent Application Publication No. 2014/0114556

SUMMARY OF INVENTION

Technical Problem

In the techniques described in PTLs 1 and 2 described above, it is known that, when features are clear, a traffic state can be predicted with certain accuracy even in an irregular event. However, there is a problem that it is difficult for these techniques to estimate an influence of an irregular event with high accuracy.

When an irregular event occurs, features associated with a traffic state depend on severity of the event, occurrence location, occurrence time, and the like. Accordingly, it is difficult to determine whether a feature obtained when an event occurs matches a feature observed in the past. If inappropriate features that do not match are used, prediction of a traffic state is more likely to be largely wrong.

There is also another problem that it is difficult for a road administrator to recognize how determination of a process scenario, such as a process method or a handling time, influences on a traffic state, and to make a clear decision on the process scenario.

The present invention has been made in view of the above-described problems, and an example object of the present invention is to provide a traffic control support system, a traffic control support method, and a program recording medium which are capable of accurately predicting a traffic state when an irregular event occurs, and accurately predicting an influence of the event on the traffic state.

Solution to Problem

A traffic control support system according to an exemplary aspect of the present invention includes: calculation means for calculating, based on a relation between a flow rate and a density of traffic and a predicted value of the density in a regular state in each of a plurality of locations, an estimated value of the density in each of one or more locations at a specific time after an event starting time representing a time at which an irregular event occurs in at least one of the plurality of locations; and display control means for displaying an influence of the irregular event on traffic in each of one or more locations, based on an estimated value of the density.

A traffic control support method according to an exemplary aspect of the present invention includes: calculating, based on a relation between a flow rate and a density of traffic and a predicted value of the density in a regular state in each of a plurality of locations, an estimated value of the density in each of one or more locations at a specific time after an event starting time representing a time at which an irregular event occurs in at least one of the plurality of locations; and displaying an influence of the irregular event on traffic in each of one or more locations, based on an estimated value of the density.

A computer readable storage medium records thereon a program causing a computer to perform a method including: calculating, based on a relation between a flow rate and a density of traffic and a predicted value of the density in a regular state in each of a plurality of locations, an estimated value of the density in each of one or more locations at a specific time after an event starting time representing a time at which an irregular event occurs in at least one of the plurality of locations; and displaying an influence of the irregular event on traffic in each of one or more locations, based on an estimated value of the density.

Advantageous Effects of Invention

According to the present invention, it is possible to obtain an advantageous effect that, when an irregular event occurs,

BRIEF DESCRIPTION OF DRAWINGS

FIG. 4 is a diagram illustrating one example of irregular event information held in an irregular event storage unit of the traffic control support system according to the second example embodiment of the present invention;

FIG. 14 is a diagram illustrating an example of a scenario of a traffic control support system according to a fourth example embodiment of the present invention;

EXAMPLE EMBODIMENT

Example embodiments of the present invention will be described in detail below with reference to the drawings.

First Example Embodiment

Figure 1:
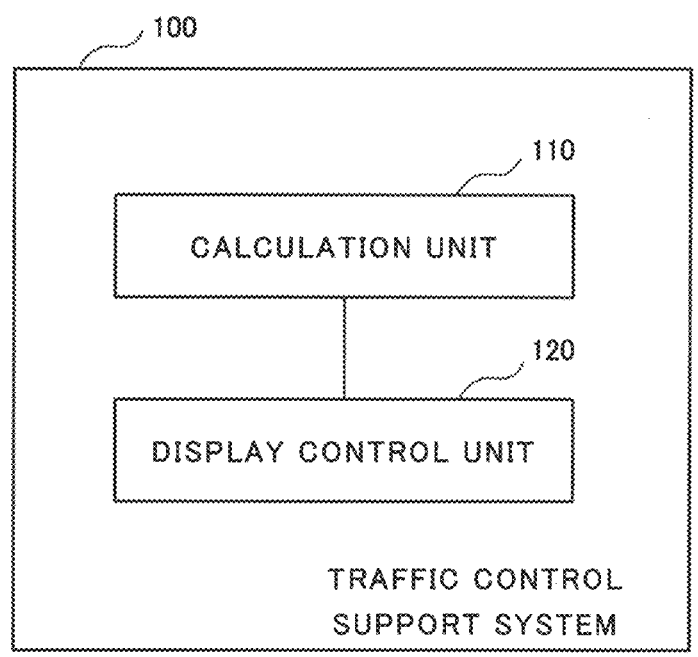
FIG. 1 is a block diagram illustrating a configuration of a traffic control support system according to a first example embodiment of the present invention.

FIG. 1 is a block diagram illustrating a configuration of a traffic control support system 100 according to a first example embodiment of the present invention. As illustrated in FIG. 1, the traffic control support system 100 includes a calculation unit 110 and a display control unit 120.

The calculation unit 110 calculates, based on a relation between a flow rate and a density of traffic, and a predicted value of the density in a regular state, in each of a plurality of locations, an estimated value of the density in each of one or more locations at a specific time after an event starting time representing a time at which an irregular event has occurred in at least one of the plurality of locations.

The display control unit 120 displays an influence of the irregular event on traffic in each of one or more locations, based on an estimated value of the density.

By employing the above-described configuration, according to the first example embodiment, it is possible to obtain an advantageous effect that, when an irregular event has occurred, a traffic state can be accurately predicted and an influence of the event on the traffic state can be accurately predicted.

Second Example Embodiment

First, a road, a traffic state, and an irregular event according to a second example embodiment of the present invention will be described.

Figure 2:
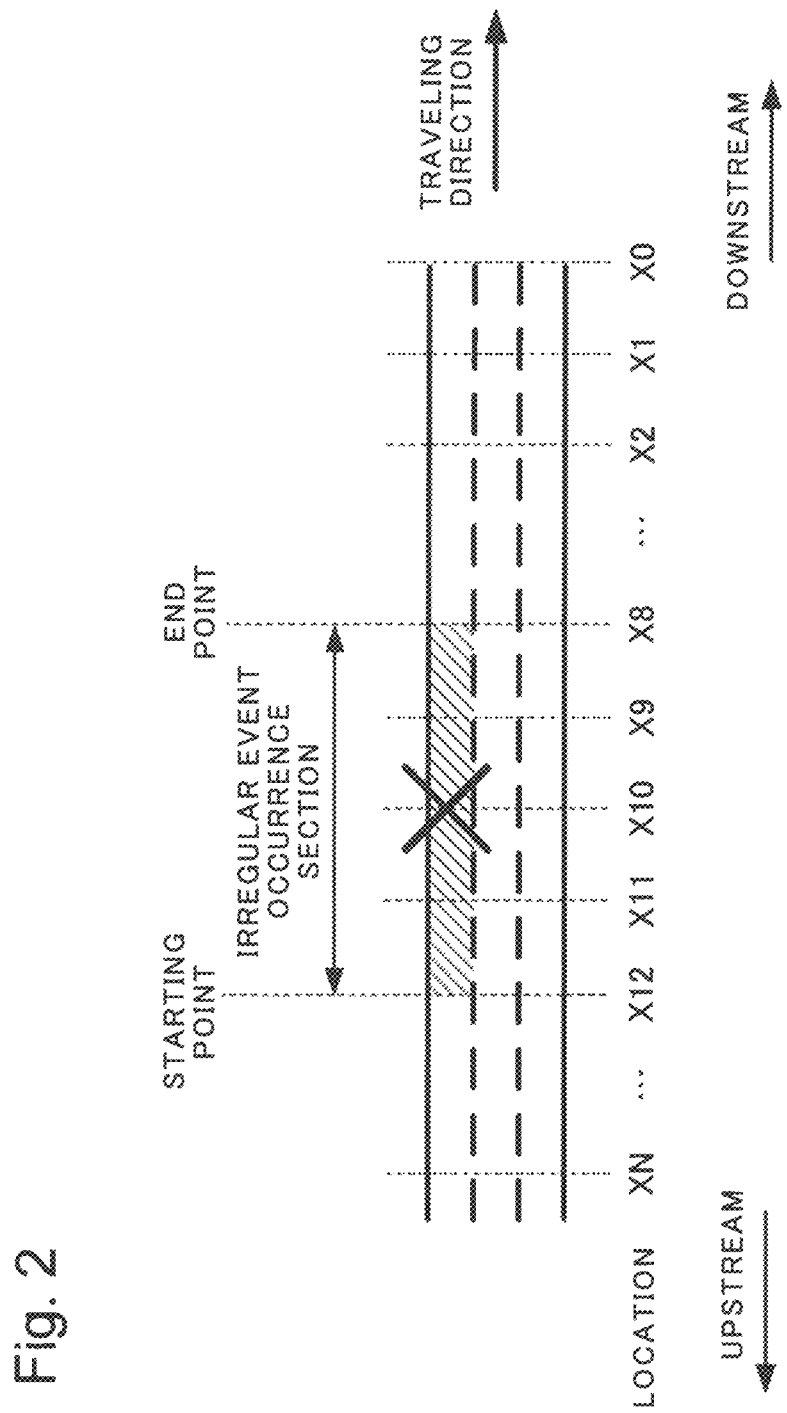
FIG. 2 is a diagram illustrating an example of a road according to a second example embodiment of the present invention.

FIG. 2 is a diagram illustrating an example of a road in the example embodiment of the present invention. As illustrated in FIG. 2, on the road, a plurality of monitoring target locations Xi (i=0, 1, 2, . . . , N; N represents the number of monitoring target locations) are defined. The location X0 represents an end point of the road. Assuming that a direction toward the end point is a traveling direction, the traveling direction is referred to as "downstream" and the reverse direction to the traveling direction is referred to as "upstream".

The second example embodiment of the present invention describes operation by using the road as illustrated in FIG. 2 as an example.

Although it is assumed in FIG. 2 that a road is a straight road for ease of explanation, the road is not limited to this. The road may be a road of other structure such as a road including an intersection with a traffic light, a road with a plurality of traffic lanes, or a car dedicated road. Alternatively, the road may be a road within a city, and a highway connecting cities.

Further, in the second example embodiment of the present invention, a traffic flow rate (hereinafter also referred to as a "flow rate"), a traveling speed (hereinafter also referred to as a "speed"), and a vehicle density (hereinafter also referred to as a "density") are used as types of a traffic state in each location on the road. The traffic flow rate indicates the number of vehicles passing through a location per unit time (number of passing vehicles). The speed indicates an average of speeds of a plurality of vehicles in a location.

The vehicle density indicates the number of vehicles per unit length, generally, per kilometer. Generally, in traffic management, the vehicle density itself is not measured, and a ratio (space occupancy) of a section spatially occupied by vehicles to a predetermined section including a location, or a ratio (time occupancy) of a time length temporally occupied by vehicles to a predetermined time length at the location, is measured for use. These measured values can be converted with each other, and can also be converted into a vehicle density by giving an average vehicle length. Accordingly, the second example embodiment of the present invention is described by using the vehicle density.

When an accident, construction work, or the like has occurred on the road, a road administrator or the like performs a process, such as traffic lane regulation, in accordance with a process scenario (hereinafter also referred to simply as a "scenario"). An event that causes a traffic state different from a general traffic state, such as an accident, traffic lane regulation in association with an accident, or traffic lane regulation in association with a planned construction work, is referred to as an "irregular event" in this example embodiment and subsequent example embodiments.

Next, a configuration of the second example embodiment of the present invention will be described.

Figure 3:
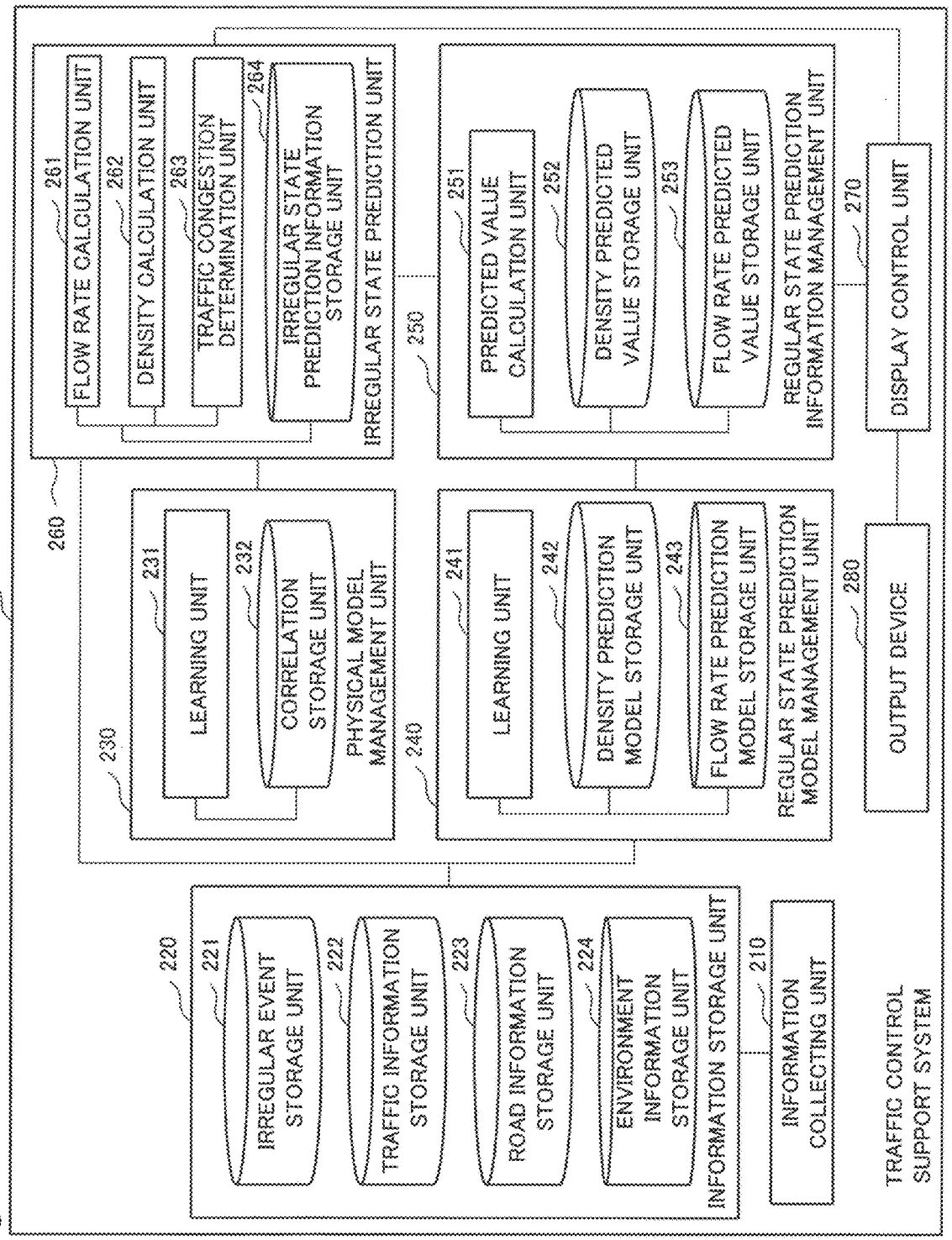
FIG. 3 is a block diagram illustrating a configuration of a traffic control support system according to the second example embodiment of the present invention.

FIG. 3 is a block diagram illustrating a configuration of a traffic control support system 200 according to the second example embodiment of the present invention. The traffic control support system 200 supports traffic control by predicting a traffic state in each location at a time when the irregular event as described above is occurring. As illustrated in FIG. 3, the traffic control support system 200 includes an information collecting unit 210, an information storage unit 220, a physical model management unit 230, a regular state prediction model management unit 240, a regular state prediction information management unit 250, an irregular state prediction unit 260, a display control unit 270, and an output device 280.

An outline of each component will be described.

The information collecting unit 210 collects various pieces of information such as information indicating traffic states. For example, the information collecting unit 210 collects measured values of the traffic states in each location on the road, such as an average speed, density, and time required for passage of traveling vehicles for each road section. The information collecting unit 210 collects measured values of the traffic states at a predetermined collection interval, for example, from sensors that are arranged in a fixed manner in each location. Further, the information collecting unit 210 may collect measured values of the traffic states in each location from a terminal mounted on each vehicle traveling on the road.

The collected traffic states includes traffic states in a regular state and traffic states in an irregular state. The regular state described herein refers to a state in which a traffic state on the road is normal, such as a state in which an accident, construction work, vehicle regulation, or the like is not occurring. The irregular state described herein refers to a state in which a traffic state on the road is different from the state in which the traffic state on the road is normal, such as a state in which an accident, construction work, vehicle regulation, or the like is occurring.

The information collecting unit 210 also collects information indicating a time at which an irregular event, such as an accident or traffic lane regulation, has occurred (started), a location where the irregular event has occurred (started), or the like, information indicating the number of traffic lanes, a regulation speed, or a connection relation with another road for each road section, or weather information.

The information storage unit 220 includes an irregular event storage unit 221, a traffic information storage unit 222, a road information storage unit 223, and an environment information storage unit 224.

The irregular event storage unit 221 stores the information, which is collected by the information collecting unit 210, indicating a time at which an irregular event, such as an accident or traffic lane regulation, has occurred (started), or a location where the irregular event has occurred (started). FIG. 4 is a diagram illustrating one example of irregular event information held in the irregular event storage unit 221.

As illustrated in FIG. 4, the irregular event information includes items such as "start point", "end point", "starting time", "end scheduled time", "type", and "countermeasure". The "start point" and the "end point" respectively represent locations of a start point and an end point in a section where an irregular event has occurred on the road as illustrated in FIG. 2.

The "start time" and the "end scheduled time" respectively represent a start time and an end scheduled time of the irregular event such as traffic lane regulation. The "type" represents a type of the irregular event such as a construction work or accident. The "countermeasure" represents specific countermeasure contents depending on the "type" when the countermeasure is taken for the irregular event, and includes one-lane regulation, two-lane regulation, and the like.

Figure 5:
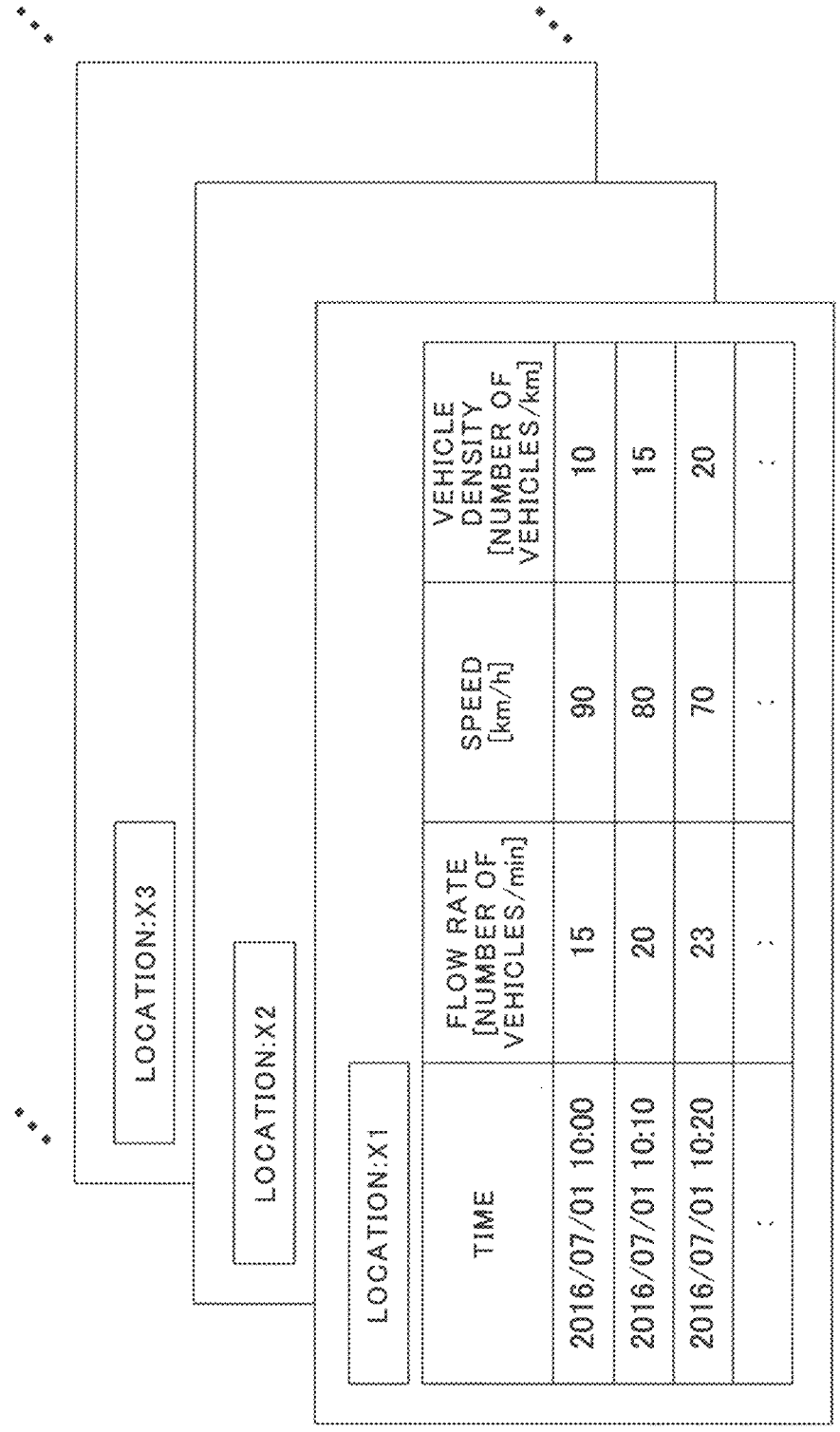
FIG. 5 is a diagram illustrating one example of traffic state information stored in a traffic information storage unit of the traffic control support system according to the second example embodiment of the present invention.

The traffic information storage unit 222 stores traffic state information indicating, for each road section, an average speed, density, a time required for passage of traveling vehicles, and the like. FIG. 5 is a diagram illustrating one example of the traffic state information stored in the traffic information storage unit 222. As illustrated in FIG. 5, the traffic state information may include a flow rate, a speed, and a vehicle density for each time in each location.

The road information storage unit 223 stores information indicating the number of traffic lanes, a regulation speed, or a connection relation with another road, and the like, for each road section. The environment information storage unit 224 stores information that may have an influence on a traffic state, such as weather information, calendar information indicating a day of the week or the like, and a time zone (hereinafter referred to as "environment information").

The physical model management unit 230 includes a learning unit 231 and a correlation storage unit 232. The learning unit 231 learns, as a physical model of a traffic flow, a correlation between a vehicle density and a traffic flow rate or speed in each location, based on the information that is collected by the information collecting unit 210 and stored in the information storage unit 220. The correlation storage unit 232 stores the correlation between the vehicle density and the traffic flow rate or speed in each location, which is learned by the learning unit 231, and a threshold density obtained from the correlation.

The regular state prediction model management unit 240 includes a learning unit 241, a density prediction model storage unit 242, and a flow rate prediction model storage unit 243. The learning unit 241 learns a prediction model of a vehicle density and a prediction model of a traffic flow rate in each location so as to predict traffic states in the status in which no irregular event is occurring. The density prediction model storage unit 242 stores the prediction model of the vehicle density in each location which is learned by the learning unit 241. The flow rate prediction model storage unit 243 stores the prediction model of the traffic flow rate in each location which is learned by the learning unit 241.

The regular state prediction information management unit 250 includes a predicted value calculation unit 251, a density predicted value storage unit 252, and a flow rate predicted value storage unit 253. The predicted value calculation unit 251 calculates predicted values of traffic states, i.e., the density and the flow rate, in the regular state based on the prediction models stored in the density prediction model storage unit 242 and the flow rate prediction model storage unit 243. The density predicted value storage unit 252 and the flow rate predicted value storage unit 253 respectively store the predicted value of the vehicle density and the predicted value of the traffic flow rate in each location which are calculated by the predicted value calculation unit 251.

The irregular state prediction unit 260 includes a flow rate calculation unit 261, a density calculation unit 262, a traffic congestion determination unit 263, and an irregular state prediction information storage unit 264. The flow rate calculation unit 261 calculates a flow rate predicted value of each location in a status in which an irregular event is occurring. The density calculation unit 262 calculates an increment of the density from the predicted value of the density in the regular state that is caused due to the irregular event, and a density in the irregular state, based on the flow rate in the irregular state, the flow rate predicted value in the regular state, the correlation stored in the correlation storage unit 232, and the like.

The traffic congestion determination unit 263 determines the presence or absence of traffic congestion in each location based on the calculation result obtained by the density calculation unit 262, the correlation stored in the correlation storage unit 232, and the like.

The irregular state prediction information storage unit 264 stores the predicted values of the traffic states in the status in which the irregular event is occurring, which are calculated by the flow rate calculation unit 261 and the density calculation unit 262, and the traffic congestion determination result obtained by the traffic congestion determination unit 263.

The display control unit 270 causes the output device 280 (display device) to display an influence of the irregular event on traffic based on the predicted values of the traffic states in the regular state which are held in the regular state prediction information management unit 250, and the predicted values of the traffic states in the irregular state which are held in the irregular state prediction information storage unit 264. The display control unit 270 also may provide an external system with the predicted values of the traffic states in the regular state and the irregular state. The output device 280 outputs (displays) the influence of the irregular event on the traffic to the road administrator or the like.

Next, the operation according to the example embodiment of the present invention will be described.

The traffic control support system 200 acquires vehicle probe data and the like transmitted by a traffic counter installed in the road, or a terminal mounted on a vehicle, through the information collecting unit 210, and stores information about the traffic state in the traffic information storage unit 222.

Further, the traffic control support system 200 also acquires environment information such as weather, a day of the week, and a time zone, through the information collecting unit 210, and stores the environment information in the environment information storage unit 224. These pieces of information may be collected from other systems, or may be collected through an input by an administrator or the like.

Furthermore, the traffic control support system 200 stores, in the irregular event storage unit 221, information about the irregular event, such as an accident, construction work, or traffic lane regulation. If the irregular event is scheduled in advance, such as a planned construction work, these pieces of information may be registered before the event occurs. Alternatively, these pieces of information may be sequentially collected and registered after the event has occurred. Further, these pieces of information may be collected via any sensor device such as a camera, or may be collected through an input by the road administrator or the like.

Figure 6:
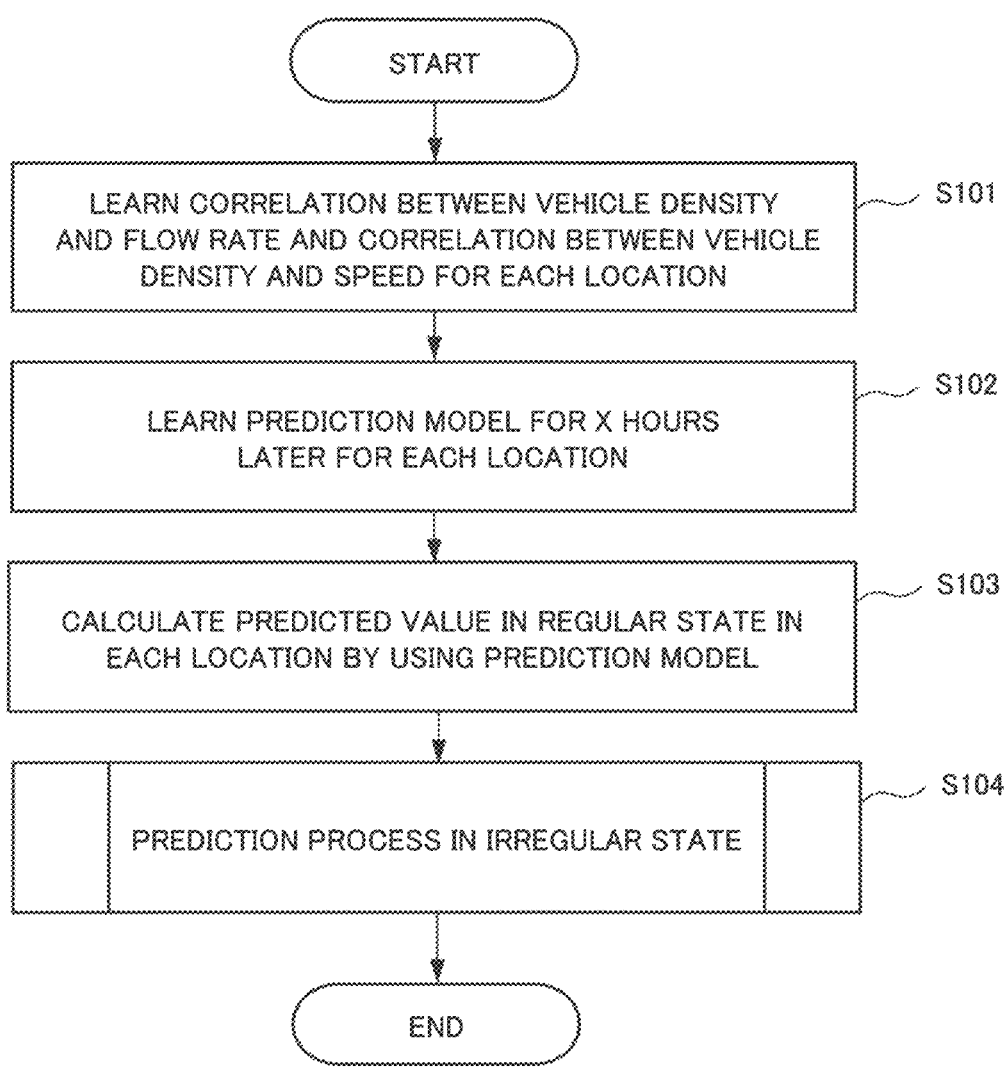
FIG. 6 is a flowchart describing a learning process and a prediction process in the traffic control support system according to the second example embodiment of the present invention.

As described above, when sufficient information is stored in the information storage unit 220, the traffic control support system 200 learns models and performs a prediction process using the learned models. FIG. 6 is a flowchart describing the learning process and the prediction process of the traffic control support system 200. The learning process and the prediction process of the traffic control support system 200 will be described, referring to FIG. 6.

The traffic control support system 200 learns a regular state prediction model and a physical model prior to the prediction process. The regular state prediction model is a model for predicting a traffic state in each location in the regular state. The physical model is a model indicating a correlation between the vehicle density and the traffic flow rate, which is used for predicting a traffic state in the irregular state.

In the physical model management unit 230 of the traffic control support system 200, the learning unit 231 learns a correlation between the vehicle density and the flow rate and a correlation between the vehicle density and the speed for each location, based on the information (data set) stored in the information storage unit 220 (S101).

Figure 7:
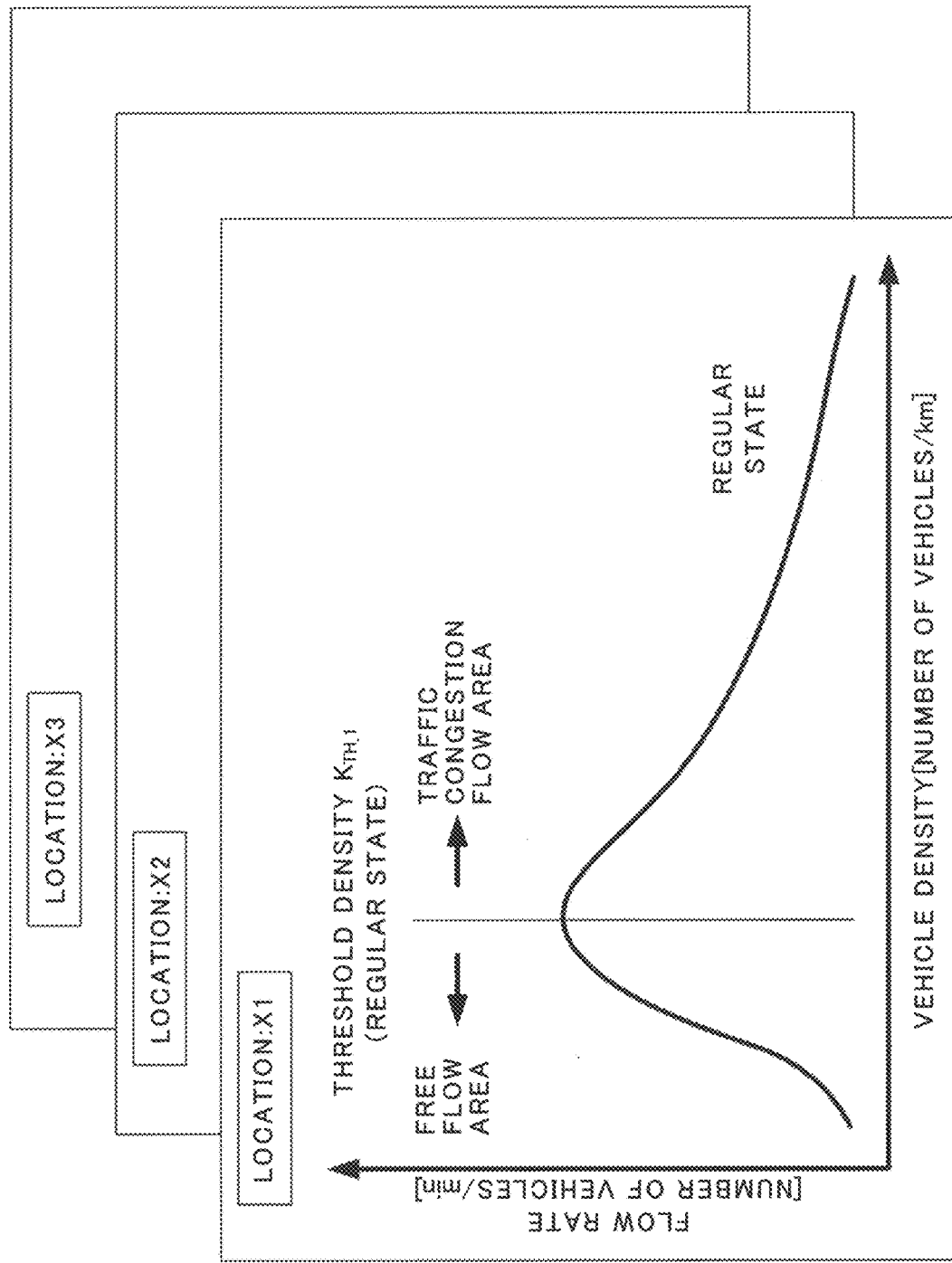
FIG. 7 is a diagram illustrating one example of a correlation between a vehicle density and a flow rate in a regular state in the traffic control support system according to the second example embodiment of the present invention.

FIG. 7 is a diagram illustrating one example of the correlation between the vehicle density and the flow rate in the regular state in the second example embodiment of the present invention. As illustrated in FIG. 7, in an area where a vehicle density in each location Xi is equal to or less than a threshold density $K_{TH\_i}$, the flow rate also increases along with an increase in the vehicle density. In this area, vehicles can travel smoothly. Accordingly, this area is referred to as a free flow area. On the other hand, when the vehicle density exceeds the threshold density $K_{TH\_i}$, the flow rate decreases along with an increase in the vehicle density. In this area, vehicles are jammed. Accordingly, this area is referred to as a traffic congestion flow area.

Figure 8:
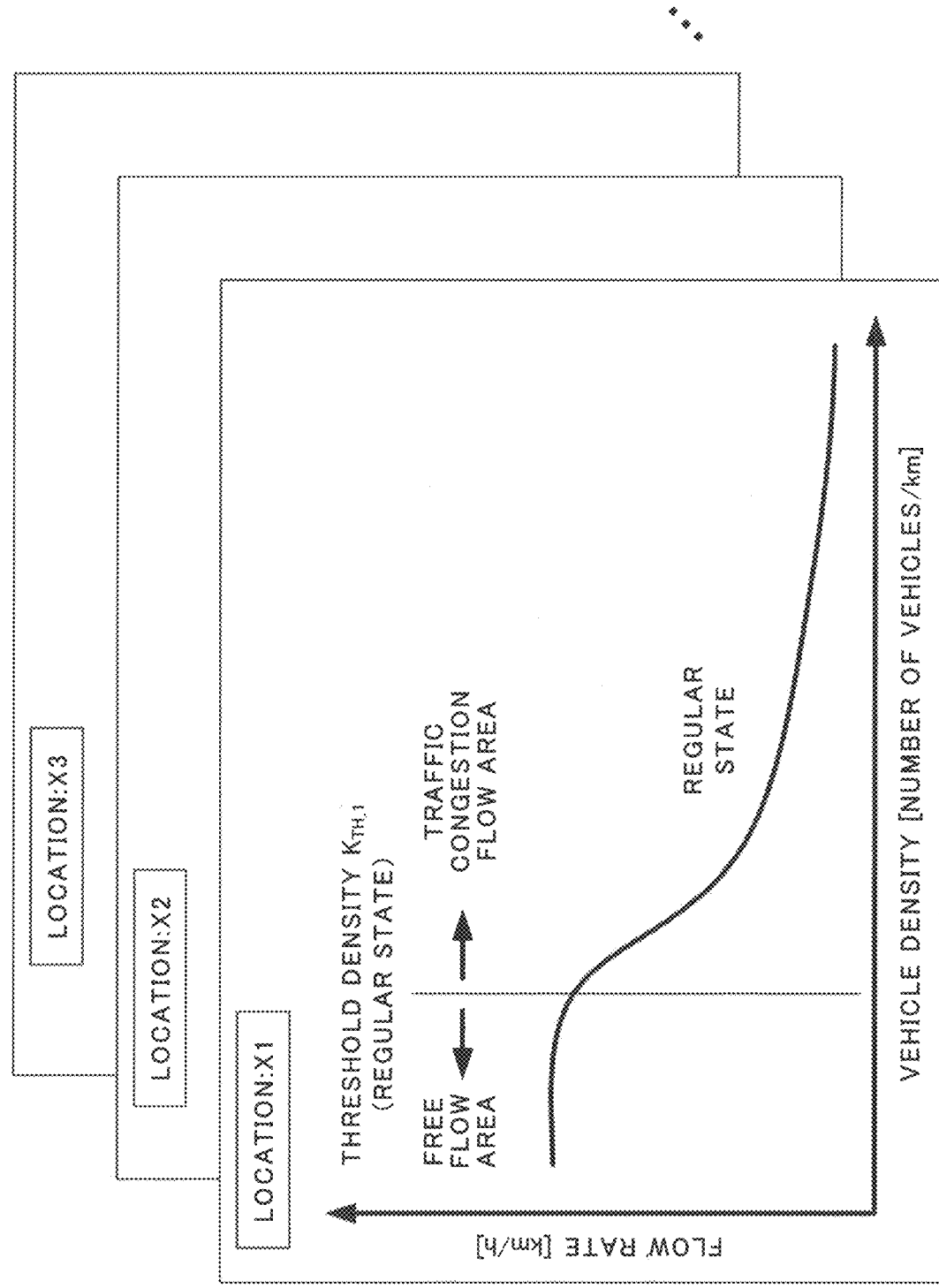
FIG. 8 is a diagram illustrating one example of a correlation between a vehicle density and a speed in a regular state in the traffic control support system according to the second example embodiment of the present invention.

FIG. 8 is a diagram illustrating one example of the correlation between the vehicle density and the speed in the regular state in the second example embodiment of the present invention. As illustrated in FIG. 8, in an area where the vehicle density is equal to or less than the threshold density $K_{TH\_i}$, the speed is constant around speed limit (free flow area). However, when the vehicle density exceeds the threshold density $K_{TH\_i}$, vehicles cannot travel freely as the vehicle density increases, and thus the speed significantly decreases (traffic congestion flow area).

Note that a function form used for learning may be determined depending on calculation accuracy. For example, a piecewise linear function may be determined as the function form. In this case, a coefficient and an intercept in each segment, and also segments may be learned as parameters, in such a way that an error between a sampling point, which is designated by the vehicle density and the flow rate, and a point indicated by the function is minimized.

In general, the above correlation can be used as a performance index in each location Xi. For example, when the vehicle density can be determined, the value of the traffic flow rate and the average traveling speed in the location can be estimated. The performance of the road may be changed depending on features in each location Xi, such as a gradient and a linear shape. Accordingly, the correlation is desirably learned for each location. Further, it is considered that the behavior of the traffic flow may be changed depending on a change in environment, such as rainfall. Accordingly, the correlations may be learned for each environment.

Figure 9:
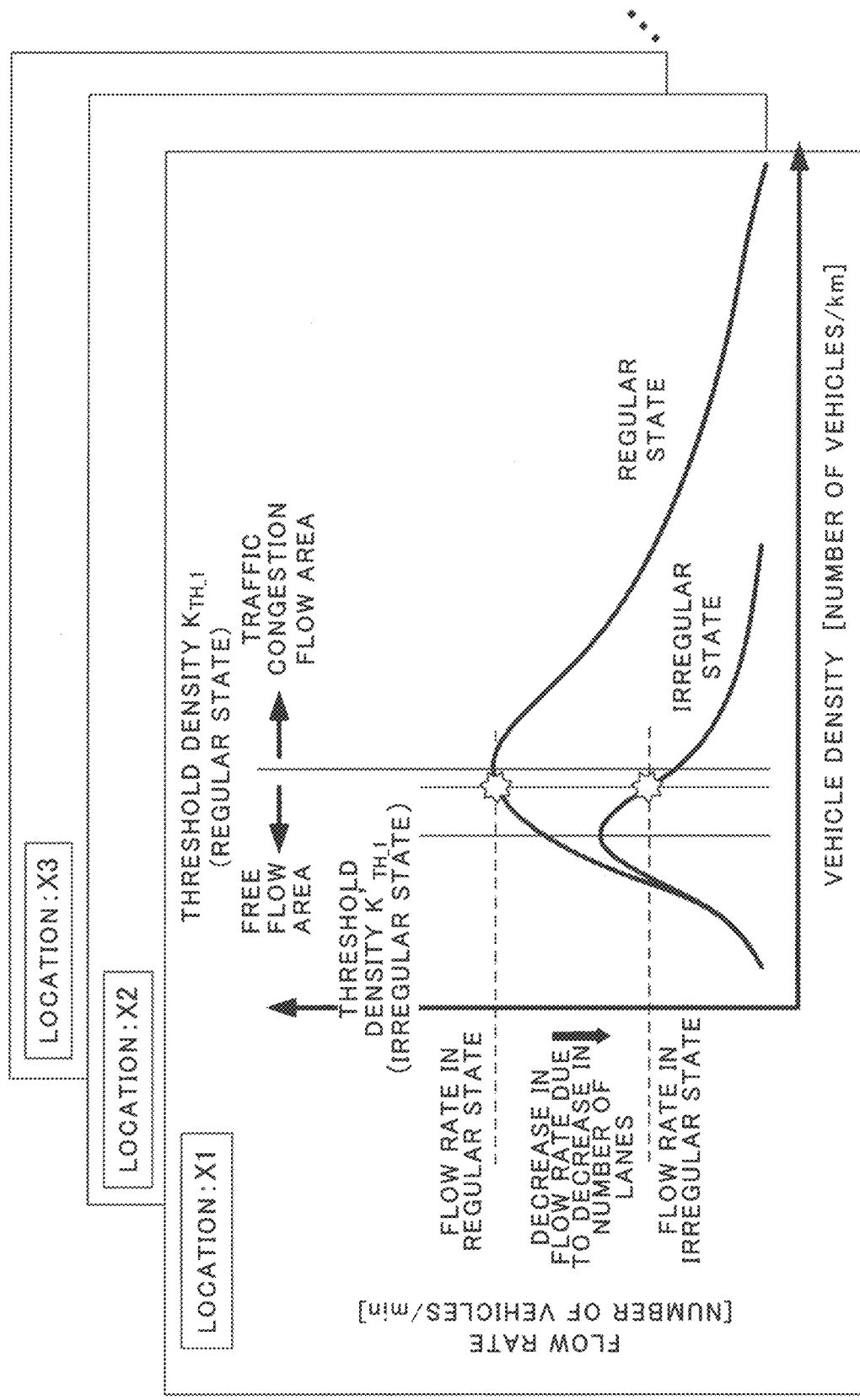
FIG. 9 is a diagram illustrating one example of a correlation between a vehicle density and a flow rate in each of a regular state and an irregular state in the traffic control support system according to the second example embodiment of the present invention.

FIG. 9 is a diagram illustrating one example of the correlation between the vehicle density and the flow rate in the regular state and the irregular state in the second example embodiment of the present invention. When an irregular event such as a construction work, accident, or traffic lane regulation has occurred (started) (irregular state), the threshold density in the location where the irregular event has occurred deteriorates more than that in the state where no irregular event has occurred (regular state) due to a change in the correlation caused by traffic lane regulation, inattentive driving of a passing-by vehicle, or the like. For example, as illustrated in FIG. 9, a threshold density $K'_{TH\_i}$ in the irregular state is lower than the threshold density $K_{TH\_i}$ in the regular state. Even when the vehicle densities are the same, the flow rate deteriorates due to a decrease in the number of traffic lanes.

For example, the correlation between the vehicle density and the flow rate when traffic lane regulation is performed as an irregular event may be generated in advance by reduction while maintaining a similar shape depending on the number of traffic lanes based on the correlation between the vehicle density and the flow rate in the regular state, and the generated correlation may be stored in the correlation storage unit 232. Alternatively, the correlation may be generated through learning by the learning unit 231, based on past information regarding when the traffic lane regulation has been performed.

It is assumed herein that based on the measured values of the traffic states in each location, the correlation between the vehicle density and the flow rate in the regular state (hereinafter also referred to as a "correlation in the regular state"), and the threshold density $K_{TH\_i}$, as well as the correlation between the vehicle density and the flow rate in the irregular state (hereinafter also referred to as a "correlation in the irregular state"), and the threshold density $K'_{TH\_i}$, which are illustrated in FIG. 9, are generated in advance by the learning unit 231 or another device, and are stored in the correlation storage unit 232.

In the second example embodiment of the present invention, the presence or absence of occurrence of traffic congestion is predicted with high accuracy by using the threshold density $K'T_H$ and the correlation in the irregular state.

Next, in the traffic control support system 200, the regular state prediction model management unit 240 learns the regular state prediction model (S102).

Specifically, the learning unit 241 of the regular state prediction model management unit 240 learns the prediction model by using the traffic information, environment information, and the like stored in the information storage unit 220 for enabling prediction of the traffic state in the regular state. The learning of the prediction model is desirably performed for each location, like the physical model. Further, different prediction models may be learned depending on the environment information such as weather conditions.

As a method for learning the prediction model, any method can be applied. For example, the prediction model for each change in environment conditions may be learned. Note that a data set used for learning, except for data on a location where the irregular event is occurring, or the time at which the irregular event is occurring, may be used for learning the prediction model.

The learning unit 241 learns a density prediction model for predicting the vehicle density in the regular state, and a flow rate prediction model for predicting the flow rate. The learned density prediction model and flow rate prediction model are stored in the density prediction model storage unit 242 and the flow rate prediction model storage unit 243, respectively. The learning unit 241 may also learn a speed prediction model depending on the type of information to be provided for users.

The traffic control support system 200 uses, for calculation of an optimum path or the like, prediction information indicating how the traffic state changes with lapse of time from the current time. Accordingly, the learning unit 241 may learn a prediction model for calculating the predicted value at a future time (prediction target time) for a time unit, for example every 30 minutes, such as 30 minutes later, one hour later, one and a half hour later, . . . , from the current time. This prediction model may be independently learned for each prediction target time. Alternatively, for example, a prediction model that enables calculation of predicted values at all prediction target times on a specific date may be learned by using environment information such as weather and a time zone, and traffic information on a date in the past.

The learning unit 241 carries out learning of the prediction models as described above at least once before the prediction process of the traffic state is performed. The learned prediction models are stored in the density prediction model storage unit 242 and the flow rate prediction model storage unit 243. The learning unit 241 may perform re-learning of the prediction models based on the collected information, depending on a lapse of time.

Note that the steps S101 and S102 illustrated in FIG. 6 are not limited to being carried out in an order of the step S101 and the step S102, but instead may be carried out in an order of the step S102 and the step S101, or may be carried out in parallel.

Next, the traffic control support system 200 calculates a predicted value in each location in the regular state by using the prediction model learned in the step S102 (S103).

Specifically, the predicted value calculation unit 251 of the regular state prediction information management unit 250 calculates predicted values of the vehicle density and flow rate by using the information stored in the information storage unit 220 and the prediction models stored in the density prediction model storage unit 242 and the flow rate prediction model storage unit 243 as described above. More specifically, the predicted value calculation unit 251 calculates predicted values of the vehicle density and the flow rate in each location on the road for prediction at a future time, for example, such as 30 minutes later, one hour later, one and a half hour later, or two hours later. The predicted value calculation unit 251 stores the calculated predicted value of the vehicle density in the density predicted value storage unit 252, and stores the calculated predicted value of the flow rate in the flow rate predicted value storage unit 253, respectively.

If no irregular event is occurring at the prediction target time, the predicted value (hereinafter also referred to as a "regular state predicted value") calculated by the predicted value calculation unit 251 can be used as the predicted value of the traffic state in each location.

The predicted value calculation unit 251 may also determine the presence or absence of traffic congestion in the predicted traffic state based on the correlation stored in the physical model management unit 230. Specifically, referring to the correlation between the vehicle density and the flow rate as illustrated in FIG. 7, when the calculated predicted value of the vehicle density exceeds the threshold density $K_{TH\_i}$, it can be determined as the traffic congestion flow area (traffic congestion is present). Accordingly, the predicted value calculation unit 251 can determine the presence or absence of traffic congestion at a future time in each location by obtaining the threshold density $K_{TH\_i}$ in each location by using the correlation between the vehicle density and the flow rate, and comparing the predicted value of the vehicle density in each location with the threshold density $K_{TH\_i}$.

Note that the display control unit 270 may provide the information indicating the presence or absence of traffic congestion determined by the predicted value calculation unit 251 for users by displaying, on the output device 280, a table in which locations are associated with the presence or absence of traffic congestion, a road map colored depending on the presence or absence of traffic congestion, or the like.

As described above, the prediction model learned by the learning unit 241 is learned without considering the influence of an irregular event. Accordingly, if an irregular event is occurring, in a section in which the irregular event is occurring and in a section in which traffic congestion (abnormal traffic congestion) caused by the irregular event is propagated, the regular state predicted value calculated by the predicted value calculation unit 251 as described above is different from the actual value.

On the other hand, in an upstream section in which the abnormal traffic congestion is not propagated yet, the traffic flow of the section can be regarded as normal, and thus the regular state predicted value can be applied. Further, it is known that the abnormal traffic congestion is propagated backward depending on the difference between the flow rate in a section in which the abnormal traffic congestion is occurring and the flow rate in a non-traffic-congestion area (free flow area) in a section adjacent to the upstream thereof. Therefore, time propagation of the abnormal traffic congestion can be calculated by estimating the flow rate in the abnormal traffic congestion area based on the correlation between the vehicle density and the flow rate held in the physical model management unit 230 and combining the estimated flow rate with the predicted value of the flow rate in the non-traffic-congestion area. Consequently, the prediction process in which the influence of the irregular event is taken into consideration can be performed.

Accordingly, the traffic control support system 200 performs the prediction process of the traffic state in the irregular state by using the model learned as described above and the calculated regular state predicted value (S104).

Figure 10:
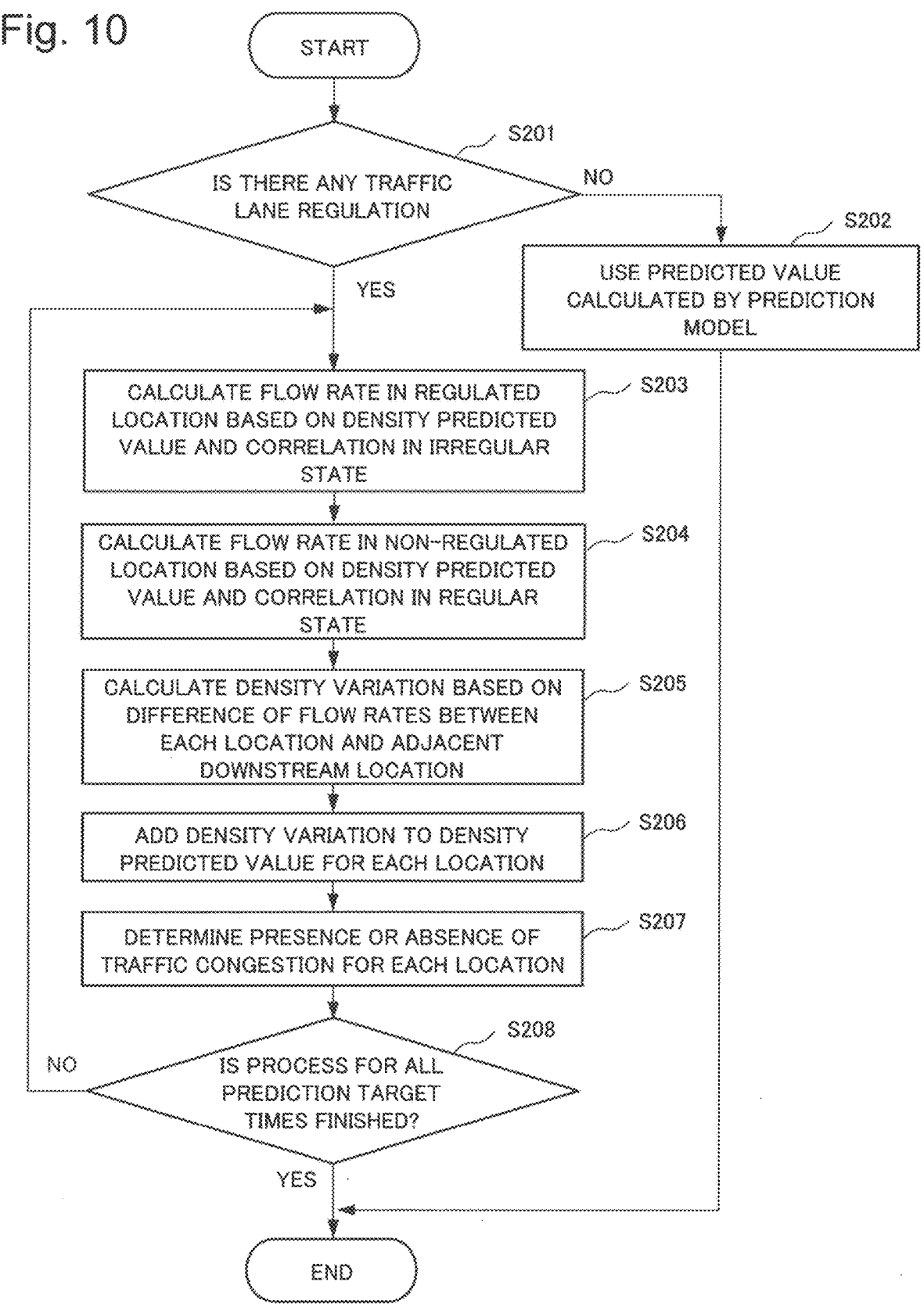
FIG. 10 is a flowchart describing a process for predicting an irregular state in the traffic control support system according to the second example embodiment of the present invention.

FIG. 10 is a flowchart describing the prediction process in the irregular state by the traffic control support system 200. Referring to FIG. 10, the prediction process in the irregular state by the traffic control support system 200 is described. Note that, as an example, a case where traffic lane regulation is started as an irregular event will now be described.

First, the traffic control support system 200 acquires, from an input means or the like, the presence or absence of the irregular event, i.e., the presence or absence of starting of the traffic lane regulation.

When there is no traffic lane regulation (No in S201), the regular state predicted value calculated in the process S103 described with reference to FIG. 6 is used as a prediction result (S202).

On the other hand, when there is the traffic lane regulation (Yes in S201), the irregular state prediction unit 260 performs the prediction process, i.e., calculation of an estimated value of the density in one or more locations at each of specific times after the event starting time, and determination as to the presence or absence of traffic congestion (traffic congestion prediction). The specific times are, for example, a time $t_1$ and a time $t_2$ after an event starting time $t_0$ to be described below.

In the road section in which traffic lanes are regulated, the flow rate for the vehicle density decreases. The correlation between the vehicle density and the flow rate at this time corresponds to the correlation in the irregular state to be reduced in size while maintaining a similar shape depending on the number of traffic lanes to be regulated as illustrated in FIG. 9.

When the vehicle density in the irregular state at a future time is estimated, the flow rate in the irregular state in each location Xi can be calculated based on the correlation in the irregular state illustrated in FIG. 9. Note that it is considered that there is no influence of traffic lane regulation at the event starting time $t_0$ yet. Accordingly, the regular state predicted value can be used for the density at the time $t_0$ as an initial value for the calculation.

The flow rate calculation unit 261 of the irregular state prediction unit 260 calculates the flow rate at the time $t_0$ in the location where there is the irregular event (traffic lane regulation), by applying the regular state predicted value of the density at the time $t_0$ to the correlation in the irregular state (S203). On the other hand, as for the location where there is no traffic lane regulation, the flow rate calculation unit 261 calculates the flow rate at the time $t_0$ in the regular state by applying the regular state predicted value of the density at the time $t_0$ to the correlation in the regular state (S204).

Next, the density calculation unit 262 calculates a density variation based on a difference of flow rates between each location and an adjacent downstream location of the location by using the flow rates calculated by the flow rate calculation unit 261 (S205). Further, the density calculation unit 262 calculates the estimated value of the density in each location after a predetermined time, i.e., after a lapse of a time $\Delta t$, from the start of the irregular event, by adding the calculated density variation to the regular state predicted value of the density for each location (S206).

Note that the regular state predicted value of the density calculated by using the prediction model is also referred to as a "density predicted value". The value of the density, which is calculated by using the density predicted value and in which the influence of traffic lane regulation is taken into consideration is referred to as a "density estimated value".

The above-described process will be described in detail below. The density estimated value based on the density predicted value at a time $(t_0+\Delta t)$ $\bar{\rho}_{x,t_0}+\Delta t$ is calculated by the following Expression (1).

$$\bar{\rho}_{x,t_0+\Delta t} = \hat{\rho}_{x,t_0} - \frac{\Delta t}{\Delta x}\left(\varphi_{x-1,\hat{\rho}_{t_0}} - \varphi_{x,\hat{\rho}_{t_0}}\right) \tag{1}$$

In the Expression (1), $\hat{\rho}_{x,t_0}$ is the density predicted value in the regular state in each location Xi at the time $t_0$, which is calculated based on a prediction model, and $\varphi_{x,\hat{\rho}_{t_0}}$ is the flow rate in each location Xi at the time $t_0$. As illustrated in FIG. 2, each location Xi has an index indicating 0 at the end point, 1, 2, . . . in the starting point direction (in the upstream direction), and X−1 at the next location from the location X toward the end point.

In the above-described Expression (1), a difference between the downstream-side flow rate and the upstream-side flow date for the adjacent locations X−1 and X is indicated by the number of vehicles remaining in the section between the location X−1 and the location X per unit time. The density variation for $\Delta t$ is calculated by multiplying the difference between the flow rates by the unit time $\Delta t$, and dividing the result by a length $\Delta x$ of the section.

Figure 11:
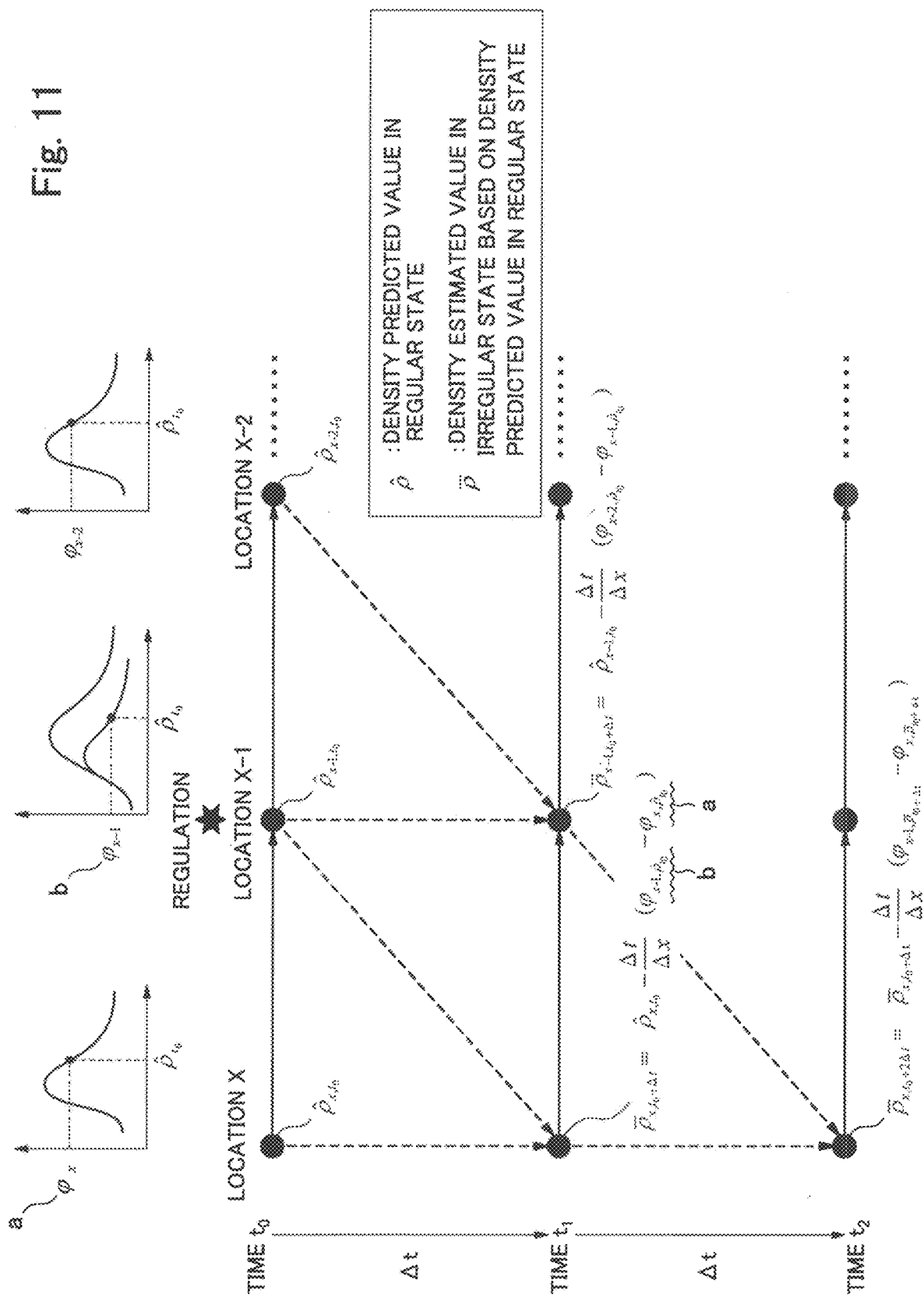
FIG. 11 is a diagram specifically describing calculation of a density estimated value of the traffic control support system according to the second example embodiment of the present invention.

FIG. 11 is a diagram specifically illustrating calculation of the density estimated value by using the above-described Expression (1). Referring to FIG. 11, the calculation of the density estimated value by using the above-described Expression (1) will be described in detail. In FIG. 11, the lateral direction represents a location on the road, and the longitudinal direction represents time. FIG. 11 illustrates the predicted values or estimated values of the density in a location X, a location X−1, a location X−2, . . . , at the event starting time $t_0$, a time $t_1$ after the time $\Delta t$ from the event starting time $t_0$, and a time $t_2$ after the time $\Delta t$ from the time $t_1$. FIG. 11 also illustrates that the traffic lane regulation is performed at and after the event starting time $t_0$ in the location X−1 among the locations X, X−1, X−2, . . . .

The density estimated value at the time $t_1$ after the time $\Delta t$ from the time $t_0$ in the location X (in the irregular state) in which the influence of the traffic lane regulation is taken into consideration is obtained by adding a density difference obtained based on the difference between the flow rate in the location X at the time $t_0$ and the flow rate in the location X−1 at the time $t_0$ as illustrated in Expression (1), to the density predicted value at the time $t_0$ in the location X. The density difference at $\Delta t$ is obtained by multiplying the flow rate difference between the locations by the unit time $\Delta t$ and dividing the result by the length $\Delta x$ between the locations as described above.

The flow rate in the location X at the time $t_0$ is obtained by applying the density predicted value in the regular state to the correlation in the regular state (indicated by "a" in FIG. 11). On the other hand, the flow rate in the location X−1 at time $t_0$ is obtained by applying the density predicted value in the regular state to the correlation in the irregular state (indicated by "b" in FIG. 11).

Next, the density estimated value at the time $t_2$ after the time $\Delta t$ from the time $t_1$ is obtained by adding a density difference obtained based on the difference between the flow rate in the location X at the time $(t_0+\Delta t)$ and the flow rate in the location X−1 at the time $(t_0+\Delta t)$ to the density estimated value at the time $(t_0+\Delta t)$ in the location X.

The flow rate in the location X at the time $(t_0+\Delta t)$ is obtained by applying the density estimated value at the time $(t_0+\Delta t)$ to the correlation in the regular state. On the other hand, the flow rate in the location X−1 at the time $(t_0+\Delta t)$ is obtained by applying the density estimated value at the time $(t_0+\Delta t)$ to the correlation in the irregular state.

Next, prediction of traffic congestion will be described. When the density calculation unit 262 calculates the density estimated value as described above, the traffic congestion determination unit 263 determines the presence or absence of traffic congestion for each location (S207). As described above, in the section between the traffic lane regulation location and the location adjacent to the traffic lane regulation location on the upstream side, the density increases with a lapse of time, as the flow rate in the forward direction (downstream side) of the section is decreased as compared with the flow rate in the regular state. Further, when the density exceeds the threshold density, the traffic congestion state occurs.

Specifically, the traffic congestion determination unit 263 uses, the correlation in the regular state for the locations X and X−2 among the locations illustrated in FIG. 11, for example, and uses the correlation in the irregular state for the location X−1, to compare the density estimated value with the threshold density $K_{TH}$ (or $K'_{TH\_i}$) for the locations. For the locations X and X−2, when the density estimated value exceeds the threshold density $K_{TH\_i}$, the traffic congestion determination unit 263 determines that traffic congestion is present, and when the density estimated value is equal to or less than the threshold density $K_{TH\_i}$, the traffic congestion determination unit 263 determines that traffic congestion is absent, for example. For the location X−1, when the density estimated value exceeds the threshold density $K'_{TH\_i}$, the traffic congestion determination unit 263 determines that traffic congestion is present, and when the density estimated value is equal to or less than the threshold density $K'_{TH\_i}$, the traffic congestion determination unit 263 determines that traffic congestion is absent, for example.

After that, the flow rate calculation unit 261, the density calculation unit 262, and the traffic congestion determination unit 263 proceed the prediction process for time $\Delta t$ later in the same manner, and performs the above-described process for all prediction target times (S208). Thus, it is possible to predict the advancement of traffic congestion due to a further chain-reaction of the density propagation with a lapse of time. Note that the traffic congestion determination unit 263 may determine the presence or absence of traffic congestion, after the density calculation unit 262 calculates the density estimated values for all prediction target times.

The result of the prediction process obtained by the density calculation unit 262 and the result of the traffic congestion determination obtained by the traffic congestion determination unit 263 are stored in the irregular state prediction information storage unit 264.

Figure 12:
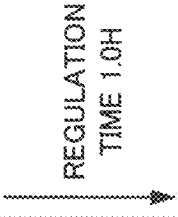
FIG. 12 is a diagram illustrating one example of a traffic congestion determination result in the traffic control support system according to the second example embodiment of the present invention.

FIG. 12 is a diagram illustrating one example of the result of the traffic congestion determination in the second example embodiment of the present invention. FIG. 12 illustrates a result of determination as to the presence or absence of traffic congestion in each location at prediction target times, 0.5 hours later, 1.0 hour later, 1.5 hours later, and 2 hours later from the start of one-lane regulation, for example. In FIG. 12, a shaded part indicates that the presence or absence of traffic congestion is determined by using the threshold density $K'_{TH\_i}$ for the irregular state, and a part other than the shaded part indicates that the presence or absence of traffic congestion is determined by using the threshold density $K_{TH\_i}$ for the regular state.

By the above-described procedure, the irregular state prediction unit 260 performs the prediction process.

After completion of the prediction process by the irregular state prediction unit 260, the display control unit 270 causes the output device 280 (display device) to display the result of the prediction process and the result of the traffic congestion determination stored in the irregular state prediction information storage unit 264. The display control unit 270 may cause the output device 280 to display the traffic congestion determination results as illustrated in FIG. 12.

As described above, according to the second example embodiment, it is possible to obtain an advantageous effect that, when an irregular event occurs, a traffic state can be accurately predicted and an influence of the event on the traffic state can be accurately predicted. This is because, the traffic control support system 200 according to the second example embodiment, when the irregular event is started, predicts the traffic state in each location by adding the density difference obtained based on the difference between the downstream-side flow rate and the upstream-side flow rate between the adjacent locations to the density predicted value at the prediction target time in the location, and determines the influence of the event (presence or absence of traffic congestion, etc.) based on the prediction result.

Thus, in consideration of the performance of the road which has deteriorated due to the irregular event, the determination as to the presence or absence of traffic congestion and the like are accurately performed. A road administrator, an emergency vehicle driver, or the like can refer to the accurate result of the traffic congestion determination and can make an accurate decision on an important matter such as decision of a path for an emergency vehicle.

Third Example Embodiment

In a third example embodiment of the present invention, a case where, in the traffic control support system 200 described in the second example embodiment described above, the irregular state prediction unit 260 calculates the density variation in the irregular state by using an expression different from Expression (1) described in the second example embodiment, will be described.

First, in the third example embodiment, it is considered that a true value of the density in the irregular state can be expressed by the following Expression (2) in which a prediction error due to the irregular event is added to the density predicted value in the regular state.

$$\rho^*_{x,t} \approx \hat{\rho}_{x,t} + \rho^{diff}_{x,t} \tag{2}$$

In the Expression (2), $\rho^*_{x,t}$ represents the true value of the density in the irregular state, $\hat{\rho}_{x,t}$ represents the density predicted value in the regular state, and $\rho^{diff}_{x,t}$ represents the prediction error of the value of the density due to the irregular event. The density predicted value in the regular state $\hat{\rho}_{x,t}$ is given by the regular state prediction information management unit 250 described above in the second example embodiment. Accordingly, in the third example embodiment, the true value of the density in the irregular state can be calculated, if the flow rate calculation unit 261 and the density calculation unit 262 calculate the following prediction error of the value of the density due to the irregular event.

$\rho^{diff}_{x,t}$

The prediction error of the value of the density due to the irregular event $\rho^{diff}_{x,t}$ is obtained by the following Expression (3).

$$\rho^{diff}_{x,t} = \rho^{diff}_{x,t-\Delta t} - \frac{\Delta t}{\Delta x}\left(\varphi^{diff}_{x-1,t-\Delta t} - \varphi^{diff}_{x,t-\Delta t}\right) \tag{3}$$

In the Expression (3), the following expressions are applied.

$\varphi^{diff}_{x,t-\Delta t} = \varphi^*_{x,t-\Delta t} - \varphi^{normal}_{x,t-\Delta t}$ $\varphi^{normal}_{x,t-\Delta t} = \varphi_1(\rho^{normal}_{x,t-\Delta t})$ $\varphi^*_{x,t-\Delta t} = \varphi_2(\rho^*_{x,t-\Delta t})$ Note that $\varphi^{diff}_{x,t-\Delta t}$ represents a difference between the flow rate in the irregular state at the time (t−Δt)

$\varphi_{x,t-\Delta t}$ and the flow rate in the regular state at the time (t−Δt)

$\varphi^{normal}_{x,t-\Delta t}$

The flow rate in the irregular state $\varphi^*_{x,t-\Delta t}$ is obtained by applying the true value of the density in the irregular state at the time (t−Δt) to the correlation in the irregular state illustrated in FIG. 9. The flow rate in the regular state $\varphi^{normal}_{x,t-\Delta t}$ is obtained by applying the density predicted value in the regular state to the correlation in the regular state illustrated in FIG. 7. However, in the case of calculating the prediction error of the value of the density in the location X at the time $t_0$ (event starting time)+Δt, the flow rate in the irregular state at the time $t_0$ is observed. Accordingly, the following Expression (3b) is used instead of Expression (3a).

$$\varphi^{diff}_{x,t_0} = \varphi_{x,t_0} - \varphi^{normal}_{x,t_0} \tag{3 b}$$

Note that $\varphi_1(\rho), \varphi_2(\rho)$ are functions representing correlations between the value of the density and the flow rate in the regular state and the irregular state, respectively.

Figure 13:
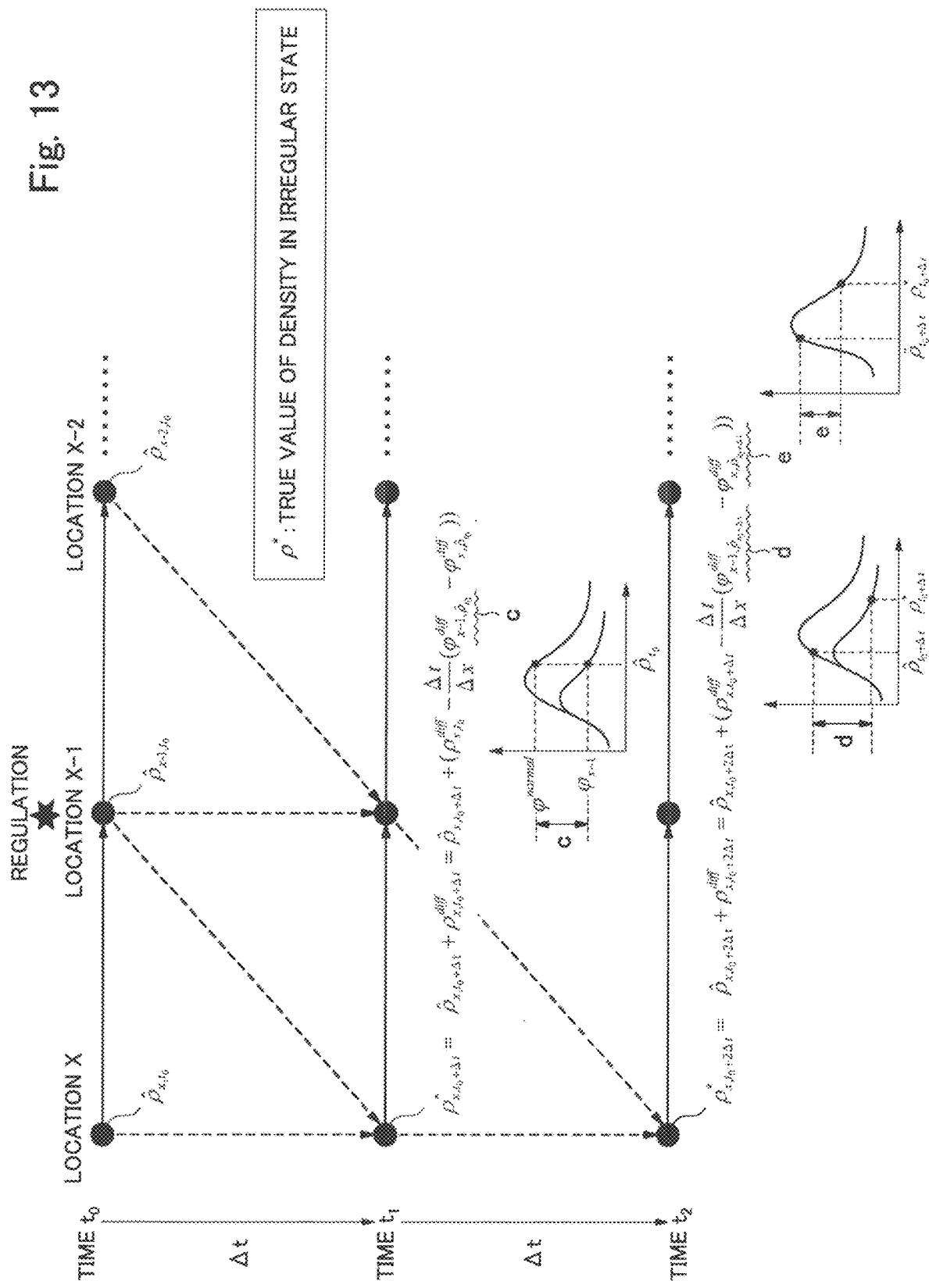
FIG. 13 is a diagram specifically describing calculation of a true value of density in an irregular state in a traffic control support system according to a third example embodiment of the present invention.

FIG. 13 is a diagram specifically describing the calculation of the true value of the density in the irregular state by using Expressions (2) and (3). Referring to FIG. 13, the calculation of the true value of the density in the irregular state by using Expressions (2) and (3) will be described in detail. In FIG. 13, like in FIG. 11, the lateral direction represents a location on the road, and the longitudinal direction represents time. FIG. 13 illustrates the predicted values or true values of the density in a location X, a location X−1, a location X−2, . . . at the event starting time $t_0$, a time $t_1$ after a time Δt from the event starting time $t_0$, and a time $t_2$ after the time Δt from the time $t_1$. FIG. 13 also illustrates that the traffic lane regulation is performed at and after the event starting time $t_0$ in the location X−1 among the locations X, X−1, X−2 . . . .

The true value of the density at the time $t_1$ after the time Δt from the time $t_0$ in the location X (in the irregular state) in which the influence of the traffic lane regulation is taken into consideration is a value obtained by adding the prediction error of the value of the density at a time ($t_0+\Delta t$) due to the irregular event to the density predicted value in the location X at the time $t_1$, as shown in Expression (2).

The prediction error is a value obtained by adding the difference between the prediction error of the flow rate in the location X−1 at the time $t_0$ and the prediction error of the flow rate in the location X at the time $t_0$ to the prediction error (initial value="0") of the value of the density at the time $t_0$ in the location X.

The location X−1 is a location where the irregular event is started. Accordingly, the prediction error of the value of the density in the location X−1 at the time $t_0$ corresponds to a difference between the flow rate calculated by applying the density predicted value at the time $t_0$ to the correlation in the irregular state and the flow rate calculated by applying the density predicted value at the time $t_0$ to the correlation in the regular state (indicated by "c" in FIG. 13).

Note that the error of the flow rate in the location X at the time $t_0$ $$\varphi_{x,\hat{p}_{t0}}^{diff}$$

has an initial value "0".

Next, the true value of the density in the irregular state at the time $t_2$ after the time $\Delta t$ from the time $t_1$ (i.e., after a time $2\Delta t$ from the time $t_0$) is a value obtained by adding the prediction error of the value of the density at the time ($t_0+2\Delta t$) to the density predicted value at the time ($t_0+2\Delta t$) in the location X.

The prediction error is a value obtained by adding the difference between the prediction error of the flow rate in the location X−1 at the time ($t_0+\Delta t$) and the prediction error of the flow rate in the location X at the time ($t_0+\Delta t$) to the prediction error of the value of the density at the time ($t_0+\Delta t$) in the location X, which is calculated as described above.

As described above, the location X−1 is the location where the irregular event is started. Accordingly, the prediction error of the value of the density in the location X−1 at the time ($t_0+\Delta t$) corresponds to a difference between the flow rate calculated by applying the true value of the density in the irregular state at the time ($t_0+\Delta t$) to the correlation in the irregular state and the flow rate calculated by applying the density predicted value at the time ($t_0+\Delta t$) to the correlation in the regular state (indicated by "d" in FIG. 13).

On the other hand, the prediction error of the value of the density in the location X at the time ($t_0+\Delta t$) corresponds to a difference between the flow rate calculated by applying the true value of the density in the irregular state at the time ($t_0+\Delta t$) to the correlation in the regular state and the flow rate calculated by applying the density predicted value at the time ($t_0+\Delta t$) to the correlation in the regular state (indicated by "e" in FIG. 13).

After that, similarly, the true value of the density in the irregular state at the prediction target time in each location is calculated by adding a variation of the prediction error of the value of the density at a second time after a first time from the prediction error of the value of the density at the first time after the event starting time, to the density predicted value in each location at the prediction target time.

Like in the second example embodiment, the traffic congestion determination unit 263 determines the presence or absence of traffic congestion based on the correlation in the regular state or the correlation in the irregular state depending on the presence or absence of traffic lane regulation, and the true value of the density in the irregular state that is calculated by the density calculation unit 262.

Figure 15:
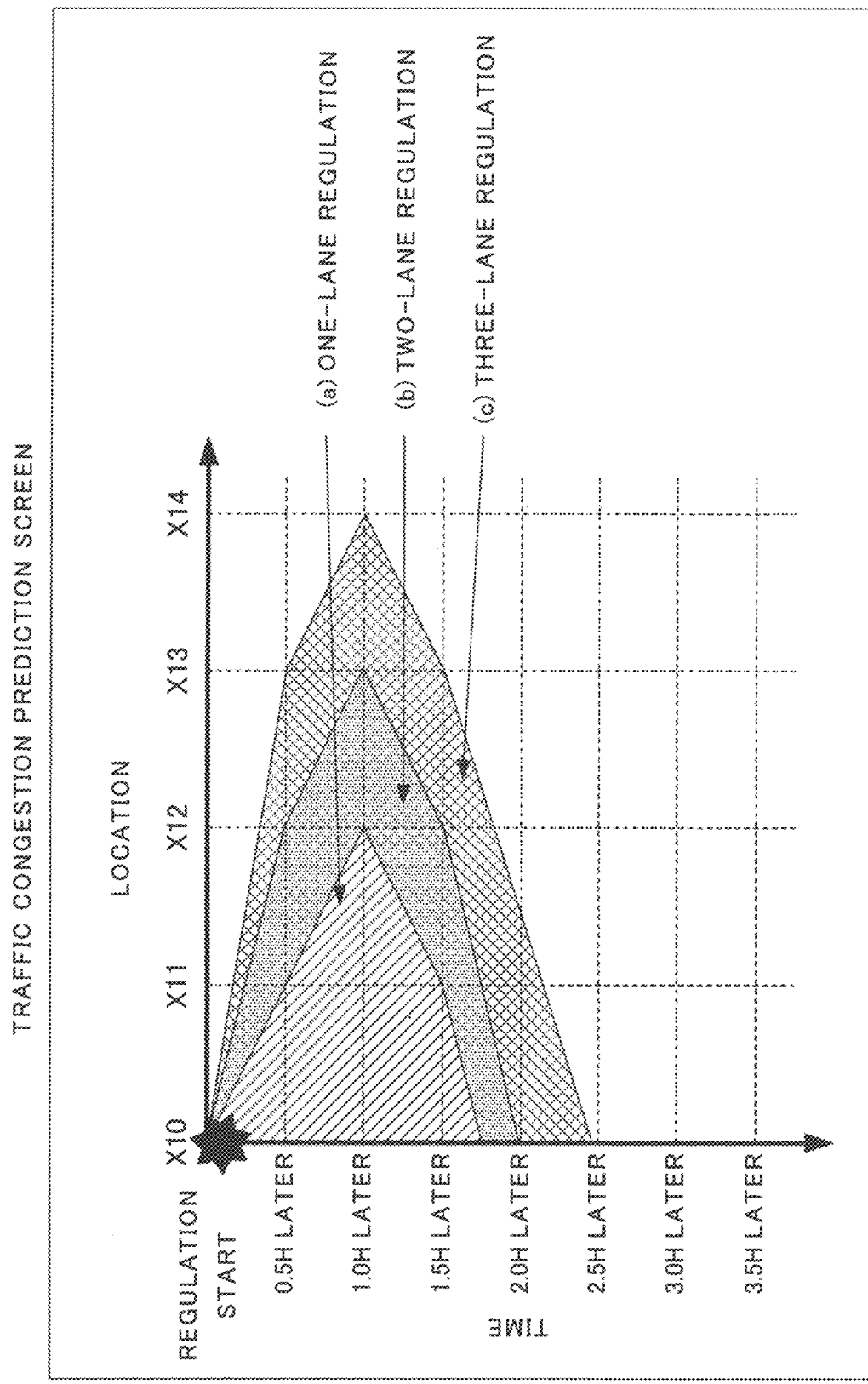
FIG. 15 is a diagram illustrating one example of a traffic congestion prediction screen of the traffic control support system according to the fourth example embodiment of the present invention.

Further, like in the second example embodiment, the display control unit 270 causes the output device 280 to display a traffic congestion prediction screen (to be described in detail below) as illustrated in FIG. 15, based on the result of the traffic congestion determination obtained by the traffic congestion determination unit 263 of the traffic control support system 200.

As described above, in the third example embodiment, it is possible to obtain an advantageous effect that the traffic state when an irregular event has occurred can be accurately predicted. This is because the traffic control support system 200 according to the third example embodiment calculates the true value of the density in the irregular state at the prediction target time in each location by adding a variation of the prediction error of the value of the density at the second time after the first time from the prediction error of the value of the density at the first time after the event starting time, to the density predicted value in each location at the prediction target time.

Fourth Example Embodiment

In a fourth example embodiment of the present invention, a case where the traffic control support system 200 described in the second example embodiment and the third example embodiment is applied to the prediction process of the traffic state when an irregular event occurs in the future.

For example, when a plan for carrying out construction work is made for a certain road section, the occurring traffic state, such as the scale of traffic congestion, greatly varies depending on the scenario to be carried out for the construction work.

FIG. 14 is a diagram illustrating an example of the scenario in the fourth example embodiment of the present invention. As illustrated in FIG. 14, it is considered that the scenario includes traffic lane regulation to be performed in a location where an accident has occurred, inward traffic regulation to be performed in a location in the upstream direction (the reverse direction to the traveling direction) from the location where the accident has occurred, speed regulation to be performed upstream from the location where the accident has occurred, and the like. In addition to the example illustrated in FIG. 14, the traffic state is also influenced by the length of a regulation section, the regulation end time, and the like.

In the fourth example embodiment of the present invention, a case where a plurality of scenarios are assumed for occurrence of an irregular event at a future time, and the influences of the respective scenarios on the traffic state are compared by visualizing the influences will be described.

FIG. 15 is a diagram illustrating one example of a traffic congestion prediction screen in the fourth example embodiment. FIG. 15 illustrates a range of locations on which traffic congestion has an influence at each time in a graph in which the horizontal axis represents a location in the upstream direction with a location X10 being set as a starting point, and the vertical axis represents time per 0.5 hours with the regulation start time being set as a starting point. In the example illustrated in FIG. 15, the transition of the range of the locations (length of traffic congestion) on which traffic congestion has an influence, with respect to the prediction target time, for a plurality of scenarios, i.e., the number of traffic lanes to be regulated, is indicated in darker color as the number of the traffic lanes increases. In this case, the length of traffic congestion increases as the number of traffic lanes to be regulated increases.

In the fourth example embodiment, the traffic control support system 200 preliminarily stores the correlation in the irregular state as illustrated in FIG. 9 in the correlation storage unit 232 for each scenario, and performs the prediction process, which is described in the second example embodiment and the third example embodiment, by using the correlation in the irregular state corresponding to the scenario.

Further, the display control unit 270 causes the output device 280 to display the traffic congestion prediction screen as illustrated in FIG. 15, based on the result of the traffic congestion determination obtained by the traffic congestion determination unit 263 of the traffic control support system 200.

Figure 16:
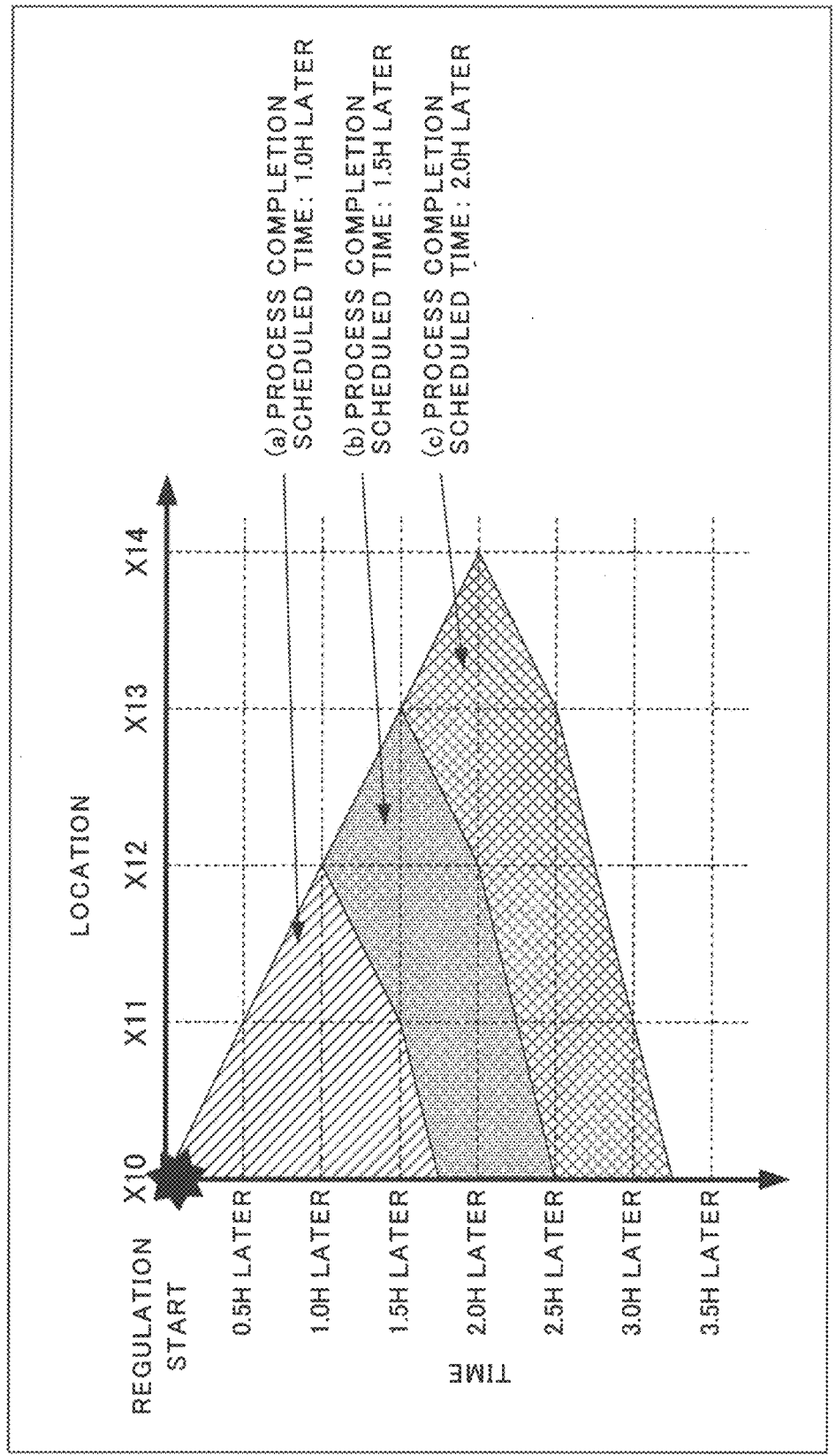
FIG. 16 is a diagram illustrating another example of the traffic congestion prediction screen of the traffic control support system according to the fourth example embodiment of the present invention.

FIG. 16 is a diagram illustrating another example of the traffic congestion prediction screen in the fourth example embodiment. FIG. 16 illustrates the range of the locations on which traffic congestion has an influence at each time in a graph in which the horizontal axis represents a location in the upstream direction with a location X10 being set as a starting point, and the vertical axis represents time per 0.5 hours with the regulation start time being set as a starting point. In the example illustrated in FIG. 16, the transition of the length of traffic congestion, with respect to the prediction target time, at each process completion scheduled time for traffic lane regulation or the like, is indicated in darker color as the process completion scheduled time is delayed. In this case, the traffic congestion becomes long as the process time increases (process completion scheduled time is delayed).

Note that the display control unit 270 is not limited to a configuration for causing the output device 280 to display the traffic congestion prediction screen as illustrated in FIGS. 15 and 16. For example, the display control unit 270 may cause the output device 280 to display the traffic congestion prediction screen, for example, in a case where the regulation start time is varied.

The road administrator or the like can compare the influences of respective scenarios on the traffic state by referring to the traffic congestion prediction screens as illustrated in FIGS. 15 and 16.

As described above, according to the fourth example embodiment, it is possible to obtain an advantageous effect that the road administrator or the like can make an accurate decision on traffic lane regulation, regulation time, and the like assuming that an irregular event occurs at a future time. This is because the traffic control support system 200 according to the fourth example embodiment preliminarily stores the correction in the irregular state for each scenario, performs the prediction process by using the correlation in the irregular state corresponding to the scenario, and displays the influence of each scenario on the traffic state based on the result of the prediction process in a comparable manner.

Figure 17:
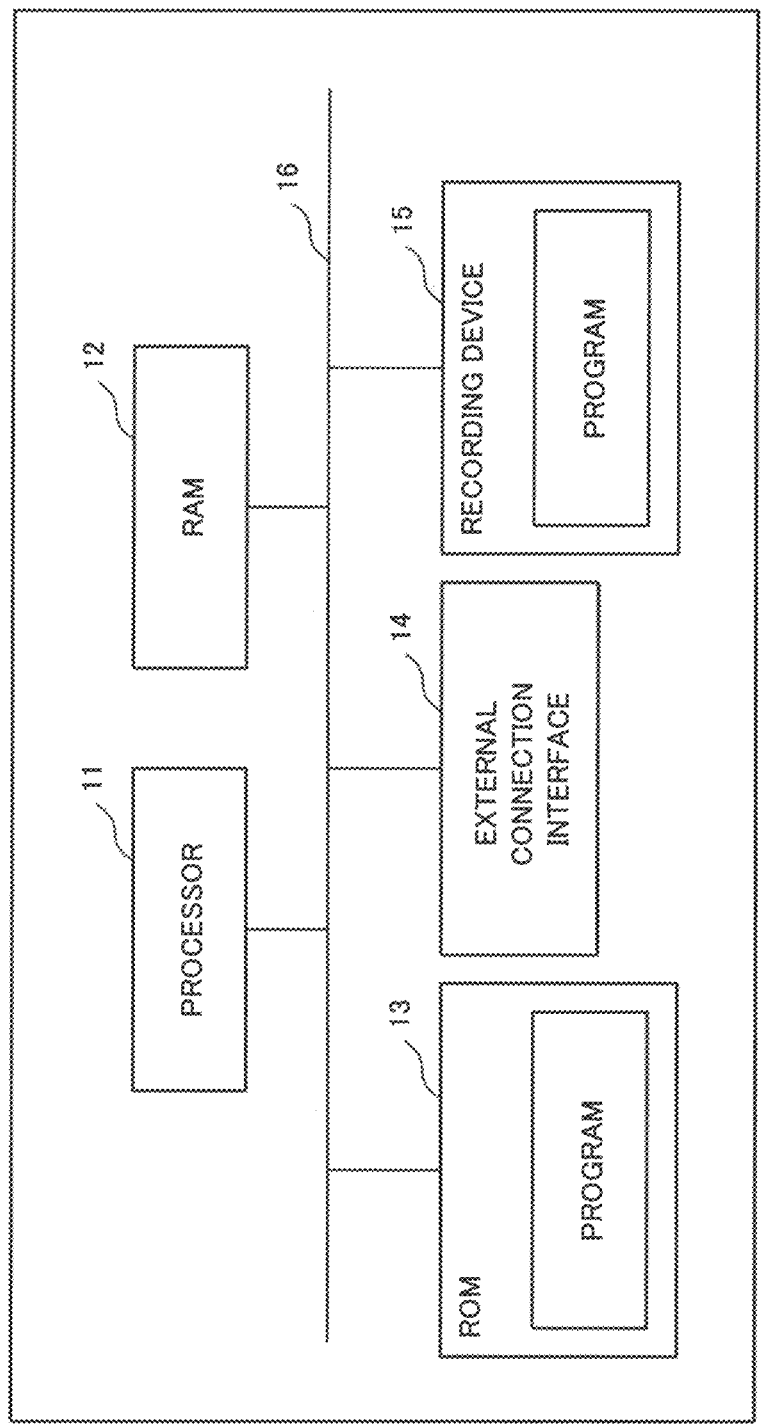
FIG. 17 is a diagram illustrating one example of a hardware configuration for implementing a device illustrated in each example embodiment.

Note that each unit of the traffic control support system illustrated in FIGS. 1, 3, and the like is implemented by hardware resources illustrated in FIG. 17. Specifically, the configuration illustrated in FIG. 17 includes a processor 11, a Random Access Memory (RAM) 12, a Read Only Memory (ROM) 13, an external connection interface 14, a recording device 15, and a bus 16 for connecting the components.

The above example embodiments describes, as one example of the configuration to be executed by the processor 11 illustrated in FIG. 17, a case where a computer program capable of implementing the above-described functions is supplied to the traffic control support system, and then the processor 11 reads the computer program into the RAM 12 and executes the computer program. However, the whole or part of the functions indicated in the respective blocks in the traffic control support system in FIGS. 1, 3, and the like may be implemented as hardware.

The supplied computer program may be stored in a computer-readable storage device such as a readable/writable memory (temporary storage medium) or a hard disk device. In such a case, it can be recognized that the present invention is configured by using a code representing the computer program, or a recording medium storing the computer program.

The whole or part of the components of each device is implemented by general-purpose or dedicated circuitry, a processor, and the like, or by a combination thereof. These may be configured by using a single chip, or may be configured by using a plurality of chips connected via a bus. The whole or part of the components of each device may be implemented by a combination of the above-described circuitry and the like and a program.

When the whole or part of the components of each device is implemented by a plurality of information processing devices, pieces of circuitry, and the like, the plurality of information processing devices, pieces of circuitry, and the like may be arranged in a centralized manner, or may be arranged in a distributed manner. For example, the information processing devices, pieces of circuitry, and the like may be implemented as a client and server system, a cloud computing system, and the like in which the information processing devices, pieces of circuitry, and the like are connected via a communication network.

While the present invention has been particularly shown and described with reference to the example embodiments thereof, the present invention is not limited to the embodiments. It will be understood by those of ordinary skill in the art that various changes in form and details may be made therein without departing from the spirit and scope of the present invention as defined by the claims.

The whole or part of the example embodiments disclosed above can be described as, but not limited to, the following supplementary notes.

(Supplementary Note 1)

A traffic control support system comprising:

calculation means for calculating, based on a relation between a flow rate and a density of traffic and a predicted value of the density in a regular state in each of a plurality of locations, an estimated value of the density in each of one or more locations at a specific time after an event starting time representing a time at which an irregular event occurs in at least one of the plurality of locations; and display control means for displaying an influence of the irregular event on traffic in each of one or more locations, based on an estimated value of the density.

(Supplementary Note 2)

The traffic control support system according to supplementary note 1, wherein the calculation means calculates a variation of the density at the specific time from a predicted value of the density at the event starting time, and calculates the estimated value of the density at the specific time, based on the variation.

(Supplementary Note 3)

The traffic control support system according to supplementary note 2, wherein the calculation means calculates a variation of the density at a second time after a first time after the event starting time from an estimated value of the density at the first time, and calculates an estimated value of the density at the second time based on the variation.

(Supplementary Note 4)

The traffic control support system according to supplementary note 2 or 3, wherein the calculation means calculates a variation of the density, based on a difference between a flow rate at a first location and a flow rate at a second location, the flow rate at the first location and the flow rate at the second location each being obtained from the relation between a flow rate and a density of traffic.

(Supplementary Note 5)

The traffic control support system according to supplementary note 1, wherein the calculation means calculates an error of a predicted value of the density at the specific time after the event starting time, and calculates the estimated value of the density at the specific time, based on the error.

(Supplementary Note 6)

The traffic control support system according to supplementary note 5, wherein the calculation means calculates a variation of the error of the predicted value of the density at the specific time after the event starting time from an error of a predicted value of the density at the event starting time, and calculates the error of the predicted value of the density at the specific time, based on the variation.

(Supplementary Note 7)

The traffic control support system according to supplementary note 5, wherein the calculation means calculates a variation of an error of a predicted value of the density at a second time after a first time after the event starting time from an error of a predicted value of the density at the first time, and calculates the error of the predicted value of the density at the second time, based on the variation.

(Supplementary Note 8)

The traffic control support system according to any one of supplementary notes 1 to 7, wherein the calculation means calculates the estimated value of the density in one or more locations at the specific time after the event starting time, assuming that the irregular event occurs at a future time in at least one of the plurality of locations.

(Supplementary Note 9)

The traffic control support system according to any one of supplementary notes 1 to 8, wherein the calculation means calculates the estimated value of the density in one or more locations at the specific time by using the relation between a flow rate and a density of traffic in an irregular state for a location where the irregular event is occurring, and by using the relation between a flow rate and a density of traffic in a regular state for a location where the irregular event is not occurring.

(Supplementary Note 10)

A traffic control support method comprising:

calculating, based on a relation between a flow rate and a density of traffic and a predicted value of the density in a regular state in each of a plurality of locations, an estimated value of the density in each of one or more locations at a specific time after an event starting time representing a time at which an irregular event occurs in at least one of the plurality of locations; and displaying an influence of the irregular event on traffic in each of one or more locations, based on an estimated value of the density.

(Supplementary Note 11)

A computer readable storage medium recording thereon a program causing a computer to perform a method comprising:

calculating, based on a relation between a flow rate and a density of traffic and a predicted value of the density in a regular state in each of a plurality of locations, an estimated value of the density in each of one or more locations at a specific time after an event starting time representing a time at which an irregular event occurs in at least one of the plurality of locations; and displaying an influence of the irregular event on traffic in each of one or more locations, based on an estimated value of the density.

This application is based upon and claims the benefit of priority from Japanese Patent Application No. 2016-138628, filed on Jul. 13, 2016, the disclosure of which is incorporated herein in its entirety by reference.

REFERENCE SIGNS LIST

11 Processor
12 RAM
13 ROM
14 External connection interface
15 Recording device
16 Bus
100, 200 Traffic control support system
110 Calculation unit
120 Display control unit
210 Information collecting unit
220 Information storage unit
221 Irregular event storage unit
222 Traffic information storage unit
223 Road information storage unit
224 Environment information storage unit
230 Physical model management unit
231 Learning unit
232 Correlation storage unit
240 Regular state prediction model management unit
241 Learning unit
242 Density prediction model storage unit
243 Flow rate prediction model storage unit
250 Regular state prediction information management unit
251 Predicted value calculation unit
252 Density predicted value storage unit
253 Flow rate predicted value storage unit
260 Irregular state prediction unit
261 Flow rate calculation unit
262 Density calculation unit
263 Traffic congestion determination unit
264 Irregular state prediction information storage unit
270 Display control unit
280 Output device

What is claimed is:

1. A traffic control support system comprising:
a memory storing instructions; and
one or more processors configured to execute the instructions to:
calculate an estimated value of a density of traffic in each of a plurality of locations at a specific time in a future after an irregular event starting time, wherein the irregular event occurs in at least one of the plurality of locations,
wherein the irregular event is any one of an accident, construction work, and vehicle regulation;
display, based on the estimated value of the density, a graph which shows a range of locations on which traffic congestion is estimated to have an influence at each future time for a plurality of scenarios in which the number of traffic lanes to be regulated are different from each other, a first axis of the graph representing a location, and a second axis of the graph representing time with a regulation start time being set as a starting time, wherein the traffic is influenced based on the displayed graph; and estimate and display vehicle travel time based on the estimated value of the density of the traffic.

2. The traffic control support system according to claim 1, wherein the one or more processors is configured to execute the instructions to:

calculate a variation of the density at the specific time from a predicted value of the density at the event starting time, and calculate the estimated value of the density at the specific time, based on the variation.

3. The traffic control support system according to claim 2, wherein the one or more processors is configured to execute the instructions to:

calculate a variation of the density at a second time after a first time after the event starting time from the estimated value of the density at the first time, and calculate the estimated value of the density at the second time based on the variation.

4. The traffic control support system according to claim 2, wherein the one or more processors is configured to execute the instructions to:

calculate a variation of the density, based on a difference between a flow rate at a first location and a flow rate at a second location, the flow rate at the first location and the flow rate at the second location each being obtained from a relation between a flow rate and a density of traffic.

5. The traffic control support system according to claim 1, wherein the one or more processors is configured to execute the instructions to:

calculate an error of a predicted value of the density at the specific time after the event starting time, and calculate the estimated value of the density at the specific time, based on the error.

6. The traffic control support system according to claim 5, wherein the one or more processors is configured to execute the instructions to:

calculate a variation of the error of the predicted value of the density at the specific time after the event starting time from an error of a predicted value of the density at the event starting time, and calculate the error of the predicted value of the density at the specific time, based on the variation.

7. The traffic control support system according to claim 5, wherein the one or more processors is configured to execute the instructions to:

calculate a variation of an error of a predicted value of the density at a second time after a first time after the event starting time from an error of a predicted value of the density at the first time, and calculate the error of the predicted value of the density at the second time, based on the variation.

8. The traffic control support system according to claim 1, wherein the one or more processors is configured to execute the instructions to:

calculate the estimated value of the density in one or more locations at the specific time after the event starting time, assuming that the irregular event occurs at a future time in at least one of the plurality of locations.

9. The traffic control support system according to claim 1, wherein the one or more processors is configured to execute the instructions to:

calculate the estimated value of the density in one or more locations at the specific time by using a relation between a flow rate and a density of traffic in an irregular state for a location where the irregular event is occurring, and by using the relation between a flow rate and a density of traffic in a regular state for a location where the irregular event is not occurring.

10. A traffic control support method comprising:

calculating an estimated value of a density of traffic in each of a plurality of locations at a specific time in a future after an irregular event starting time, wherein the irregular event occurs in at least one of the plurality of locations, wherein the irregular event is any one of an accident, construction work, and vehicle regulation;

displaying, based on the estimated value of the density, a graph which shows a range of locations on which traffic congestion is estimated to have an influence at each future time for a plurality of scenarios in which the number of traffic lanes to be regulated are different from each other, a first axis of the graph representing a location, and a second axis of the graph representing time with a regulation start time being set as a starting time, wherein the traffic is controlled influenced based on the displayed graph; and estimating and displaying vehicle travel time based on the estimated value of the density of the traffic.

11. A non-transitory computer readable storage medium recording thereon a program causing a computer to perform a method comprising:

calculating an estimated value of a density of traffic in each of a plurality of locations at a specific time in a future after an irregular event starting time, wherein the irregular event occurs in at least one of the plurality of locations, wherein the irregular event is any one of an accident, construction work, and vehicle regulation;

displaying, based on the estimated value of the density, a graph which shows a range of locations on which traffic congestion is estimated to have an influence at each future time for a plurality of scenarios in which the number of traffic lanes to be regulated are different from each other, a first axis of the graph representing a location, and a second axis of the graph representing time with a regulation start time being set as a starting time, wherein the traffic is influenced based on the displayed graph; and estimating and displaying vehicle travel time based on the estimated value of the density of the traffic.

* * * * *